US012568997B2

(12) United States Patent
Takemura et al.

(10) Patent No.: US 12,568,997 B2
(45) Date of Patent: Mar. 10, 2026

(54) EMULSION COMPOSITION USING SEED STORAGE PROTEIN AND METHOD FOR PRODUCING SAME

(71) Applicant: MIZKAN HOLDINGS CO., LTD., Aichi (JP)

(72) Inventors: Tomoya Takemura, Aichi (JP); Masashi Nakabayashi, Aichi (JP); Yasuki Matsumura, Kyoto (JP); Kentaro Matsumiya, Kyoto (JP)

(73) Assignee: MIZKAN HOLDINGS CO., LTD., Aichi (JP)

( * ) Notice: Subject to any disclaimer, the term of this patent is extended or adjusted under 35 U.S.C. 154(b) by 1113 days.

(21) Appl. No.: 17/511,006

(22) Filed: Oct. 26, 2021

(65) Prior Publication Data

US 2022/0046968 A1     Feb. 17, 2022

Related U.S. Application Data

(63) Continuation of application No. PCT/JP2020/017450, filed on Apr. 23, 2020.

(30) Foreign Application Priority Data

Apr. 26, 2019    (JP) ................................. 2019-086309

(51) Int. Cl.
| | |
|---|---|
| *A23L 27/60* | (2016.01) |
| *A23B 20/10* | (2025.01) |
| *A23D 7/00* | (2006.01) |
| *A23D 7/04* | (2006.01) |

(52) U.S. Cl.
CPC .............. *A23L 27/60* (2016.08); *A23B 20/10* (2025.01); *A23D 7/003* (2013.01); *A23D 7/04* (2013.01); *A23V 2002/00* (2013.01)

(58) Field of Classification Search
CPC ........... A23D 7/003; A23D 7/04; A23L 27/60; A23L 19/01; A23L 11/05; A23B 20/10
See application file for complete search history.

(56) References Cited

U.S. PATENT DOCUMENTS

| | | |
|---|---|---|
| 4,798,734 A | 1/1989 | Kaneda |
| 2006/0013937 A1 | 1/2006 | Hagiwara et al. |
| 2007/0059429 A1 | 3/2007 | Wild et al. |
| 2007/0207254 A1 | 9/2007 | Crank |

(Continued)

FOREIGN PATENT DOCUMENTS

| | | |
|---|---|---|
| CN | 103596451 A | 2/2014 |
| EP | 1679981 A1 | 7/2006 |

(Continued)

OTHER PUBLICATIONS

Science of Soybeans, Jun. 20, 1997, p. 27, with partial English Machine Translation, (4 pages).

(Continued)

*Primary Examiner* — Vera Stulii
(74) *Attorney, Agent, or Firm* — Osha Bergman Watanabe & Burton LLP

(57) ABSTRACT

An emulsion composition includes dry powder of dicotyledonous plant seeds in a range between 1 mass % or more and 20 mass % or less, the dry powder having an average particle size in a range between 0.2 µm or larger and 150 µm or smaller, water in a range between 20 mass % or more and 69 mass % or less, and fat and oil in a range between 21 mass % or more and 70 mass % or less.

20 Claims, 18 Drawing Sheets

(56) References Cited

U.S. PATENT DOCUMENTS

| | | |
|---|---|---|
| 2009/0081346 A1 | 3/2009 | Hagiwara et al. |
| 2009/0232958 A1 | 9/2009 | Samoto et al. |
| 2010/0022754 A1 | 1/2010 | Samoto et al. |
| 2010/0112187 A1 | 5/2010 | Crank |
| 2013/0260008 A1 | 10/2013 | Bialek et al. |
| 2014/0113013 A1 | 4/2014 | Samoto et al. |

FOREIGN PATENT DOCUMENTS

| | | |
|---|---|---|
| JP | S54110348 A | 8/1979 |
| JP | S6131056 A | 2/1986 |
| JP | H7213227 A | 8/1995 |
| JP | 2003189811 A | 7/2003 |
| JP | 2005270099 A | 10/2005 |
| JP | 2007508817 A | 4/2007 |
| JP | 2010519928 A | 6/2010 |
| JP | 2010193909 A | 9/2010 |
| JP | 2012110244 A | 6/2012 |
| WO | 2004043167 A1 | 5/2004 |
| WO | 2005/046361 A1 | 5/2005 |
| WO | 2006082640 A1 | 8/2006 |
| WO | 2006129647 A1 | 12/2006 |
| WO | 2008069273 A1 | 6/2008 |

OTHER PUBLICATIONS

Notice of Reasons for Refusal issued in corresponding Japanese Patent Application No. 2021-516196, dated Oct. 24, 2023, (14 pages).

Extended European Search Report issued in corresponding European Application No. 20794130.3; dated Oct. 7, 2022 (11 pages).

Decision to Grant a Patent issued in corresponding Japanse Patent Application No. 2021-516196 mailed Aug. 20, 2024 (4 pages).

Office Action issued in corresponding Taiwanese Patent Application No. 109113803, dated Jan. 22, 2024 (16 pages).

Y. Tanisawa et al., "Effects of Various Agricultural Food Particles on Emulsifying and Foaming Properties," J. Cookery Sci. Jpn., vol. 51, No. 1, pp. 26-36, 2018 (11 pages).

M. Evans et al., "Emulsion stabilisation using polysaccharide-protein complexes," Current Opinion in Colloid & Interface Science, vol. 18, issue 4, pp. 272-282, Aug. 2013 (32 pages).

D. Xu et al., "Influence of microcrystalline cellulose on the microrheological property and freeze-thaw stability of soybean protein hydrolysate stabilized curcumin emulsion," LWT-Food Science and Technology, vol. 66, pp. 590-597, Mar. 2016 (17 pages).

Y. Xu et al., "Structural and Functional Properties of Soy Protein Isolates Modified by Soy Soluble Polysaccharides," Journal of Agricultural and Food Chemistry, No. 64, pp. 7275-7284, Sep. 8, 2016 (10 pages).

A. Nakamura et al., "Influence of Heating on Oil-in-Water Emulsions Prepared with Soybean Soluble Polysaccharide," Journal of Agricultural and Food Chemistry, No. 55, pp. 502-509, 2007 (8 pages).

F. Liu et al., "Soy glycinin as food-grade Pickering stabilizers: Part. I. Structural characteristics, emulsifying properties and adsorption/arrangement at interface," Food Hydrocolloids, vol. 60, pp. 606-619, Oct. 2016 (30 pages).

F. Yamauchi et al., "Emulsifying Properties of Soybean B-Conglycinin and Glycinin: Evaluation by Turbidimetry," Agric. Biol. Chem., vol. 46, No. 3, pp. 615-621, 1982 (7 pages).

K. Kitamura et al., "All about Soybeans", Science Forum Inc., 2010, pp. 114-127 (8 pages).

K. Kitamura et al., "All about Soybeans", Science Forum Inc., 2010, pp. 440-447 (4 pages).

S. Fujita, "Emulsification of Foods-Basics and Applications-", Saiwai Shobo Co., Ltd., 2006, pp. 291-293 (2 pages).

F. Yamauchi, Kazuyoshi Okubo, "Science of Soybeans (Series "Science of Food")", Asakura Publishing Co., Ltd., 1992, pp. 142-145 (2 pages).

International Search Report issued in corresponding International Application No. PCT/JP2020/017450; mailed Jul. 21, 2020 (4 pages).

Written Opinion of the International Searching Authority issued in corresponding International Application No. PCT/JP2020/017450; dated Jul. 21, 2020 (5 pages).

FREQUENCY (%)

CUMULATION (%)

PARTICLE SIZE (μm)

SOYBEAN 11S PROTEIN

DRY SOYBEAN POWDER
WITH AVERAGE PARTICLE
SIZE OF 35μm

11S PROTEIN +
CELLULOSE

IMMEDIATELY AFTER
EMULSIFICATION

DRY SOYBEAN POWDER WITH
AVERAGE PARTICLE SIZE OF 35 $\mu$ m

DRY SOYBEAN POWDER WITH
AVERAGE PARTICLE SIZE OF 198 $\mu$ m 30G, 3mins

G' OF DRY SOYBEAN POWDER WITH AVERAGE PARTICLE SIZE OF 35 μm

G" OF DRY SOYBEAN POWDER WITH AVERAGE PARTICLE SIZE OF 35 μm

G' OF DRY SOYBEAN POWDER WITH AVERAGE PARTICLE SIZE OF 198 μm

G" OF DRY SOYBEAN POWDER WITH AVERAGE PARTICLE SIZE OF 198 μm

SUSPENDED IN WATER
AND LEFT TO STAND FOR 90 MINS

DRY SOYBEAN POWDER WITH AVERAGE PARTICLE SIZE OF 35 μm

DRY SOYBEAN POWDER WITH AVERAGE PARTICLE SIZE OF 129 μm

CENTRIFUGATION AT 30G FOR 3 MINS

DRY SOYBEAN POWDER WITH AVERAGE PARTICLE SIZE OF 35 $\mu$m

DRY SOYBEAN POWDER WITH AVERAGE PARTICLE SIZE OF 129 $\mu$m a
UNHEATED b
PROCESSED
AT 40°C c
PROCESSED
AT 100°C 30G, 3 mins 20MPa     40MPa     80MPa 1200G、5 mins 20MPa          40MPa          80MPa

0%   10%  20%  30%  40%   46.5%

EMULSION COMPOSITION USING SEED STORAGE PROTEIN AND METHOD FOR PRODUCING SAME

CROSS-REFERENCE TO RELATED APPLICATION

The present application is based on and claims priority to Japanese Patent Application No. 2019-086309 filed with the Japan Patent Office on Apr. 26, 2019, the disclosure of which is hereby incorporated by reference in its entirety.

TECHNICAL FIELD

One or more embodiments of the present disclosure relate to an emulsion composition including a seed storage protein and a method for producing the same.

BACKGROUND

Mayonnaise is an emulsified food that is widely liked and contains 70% or more of oil. Mayonnaise contains lecithin, which can emulsify a large amount of oil, in an amount of about 1% of its total weight. However, lecithin itself contains a lot of cholesterol due to phospholipids and is therefore not suitable for today's health-conscious consumers. Therefore, there has been a need for an emulsifier that can emulsify a large amount of oil and does not contain lipids. Protein is one of lipid-free emulsifiers.

Conventionally, dairy products and the like are represented as protein-based emulsifiers, but since they contain cholesterol and the like, vegetable proteins have been widely used because of increase in health consciousness. Among them, soybean protein may be used (see, for example, Patent Literature 1: WO 2004/043167A and Patent Literature 2: JP 2005-270099A). Seed storage proteins contained in the seeds of plants such as legumes are expected to be newly used as promising new emulsifiers for natural products in the future (see, for example, Non-Patent Literatures 1: Keisuke Kitamura et al., "All about Soybeans", Science Forum Inc., 2010, pp. 114-127, and Non-Patent Literature 2: Satoshi Fujita, "Emulsification of Foods—Basics and Applications—", Saiwai Shobo Co., Ltd., 2006, pp. 291-293, Patent Literatures 3: WO 2006/129647A, Patent Literature 4: WO 2008/069273A, and Patent Literature 5: JP 2010-193909A). However, since the oil content of general soybean is about 20%, its emulsifying power in a high oil content system such as mayonnaise has not been studied.

Soybean seed storage proteins are classified into 15S, 11S, 7S, and 2S proteins based on the sedimentation coefficient by ultracentrifugation analysis. Both 11S and 7S proteins are known to have emulsifying power and are known to have different properties such as viscosity and gelling properties. 11S protein contains a large amount of SH groups and is known to be the main component that hardens tofu (bean curd) (see, for example, Patent Literature 5 and Non-Patent Literatures 1 and 2).

However, since 11S protein has a large molecular weight and low hydrophobicity, its emulsifying power has been considered to be inferior to that of the 7S protein (see, for example, Non-Patent Literatures 1 and 2). In addition, when 11S protein is heated, its higher-order structure is destroyed and its physiological activity is lost (see, for example, Non-Patent Literature 3: Fumio Yamauchi, Kazuyoshi Okubo, "Science of Soybeans (Series "Science of Food")", Asakura Publishing Co., Ltd., 1992, pp. 143-146). For these reasons, 11S protein has not received much attention as an emulsifier.

SUMMARY

One or more embodiments of the present disclosure provide an emulsion composition that includes a vegetable protein as an emulsifier and contains a large amount of oil. One or more embodiments of the present invention provide an emulsion composition that is cholesterol-free, low in calories, and free of synthetic additives.

In accordance with one aspect of the disclosure, an emulsion composition includes dry powder of dicotyledonous plant seeds in a range between 1 mass % or more and 20 mass % or less, the dry powder having an average particle size in a range between 0.2 µm or larger and 150 µm or smaller, water in a range between 20 mass % or more and 69 mass % or less, and fat and oil in a range between 21 mass % or more and 70 mass % or less.

In accordance with another aspect of the disclosure, an emulsion composition includes 11S protein in a range between 0.14 mass % or more and 4 mass % or less, cellulose in a range between 0.02 mass % or more and 2 mass % or less, water in a range between 20 mass % or more and 69.66 mass % or less, and fat and oil in a range between 21 mass % or more and 70 mass % or less.

In accordance with another aspect of the disclosure, a method for producing an emulsion composition includes high-pressure or ultrasonic homogenization processing of a mixture including dry powder of dicotyledonous plant seeds having an average particle size in a range between 0.2 µm or larger and 150 µm or smaller, water, and fat and oil. With respect to a total amount of the mixture, a blending amount of the dry powder of dicotyledonous plant seeds is in a range between 1 mass % or more and 20 mass % or less, a blending amount of the water is in a range between 20 mass % or more and 69 mass % or less, and a blending amount of the fat and oil is in a range between 21 mass % or more and 70 mass % or less.

DETAILED DESCRIPTION

Figure 1:
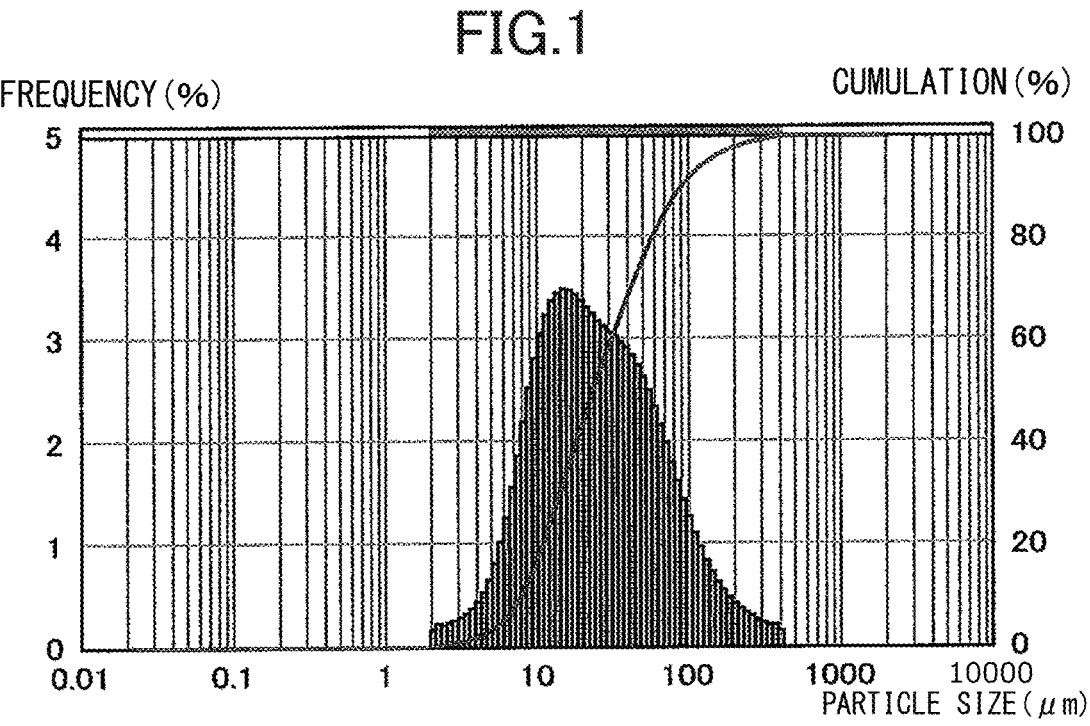
FIG. 1 shows the particle size distribution of the dry soybean powder having an average particle size of 35 µm measured with a laser diffraction particle size analyzer (Preparation Example 1).

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, one or more embodiments of the emulsion composition having excellent emulsion stability of the present application will be described. The emulsion composition of the present embodiment includes at least a predetermined amount of dry powder of dicotyledonous plant seeds having an average particle size in a range between 0.2 μm or larger and 150 μm or smaller, and water.

(Emulsion Composition) The emulsion composition of the present embodiment includes at least a dry powder of dicotyledonous plant seeds as a raw material, and water. Emulsification can be broadly classified or divided into oil-in-water and water-in-oil emulsification. The oil-in-water emulsion composition is preferable as the emulsion composition of the present embodiment because it can produce an emulsion composition having excellent smoothness, melting in the mouth, shape retention, and refrigeration/freezing resistance. Examples of the oil-in-water emulsion composition include ice creams, whipped creams, castor creams, mayonnaise, compositions having mayonnaise-like properties, coffee creams, coffee beverages, and flour pastes. Among them, those having mayonnaise-like properties (that is, viscoelasticity like mayonnaise) are preferred, and compositions having mayonnaise-like properties are particularly preferred. Examples of the water-in-oil emulsion composition include butter, margarine, spread, chocolate, and the like.

In the present specification, the term "composition having mayonnaise-like physical properties" refers to an oil-in-water emulsion composition exhibiting mayonnaise-like properties, which may or may not include acetic acid. Mayonnaise-like properties (viscoelasticity) can be expressed using the storage elasticity (also referred to as G'), loss elasticity (also referred to as G"), and/or loss tangent (ratio of loss elasticity to storage elasticity, or G"/G') at an angular frequency of 10 rad/s (10 radians per second) measured with a dynamic viscoelasticity measuring apparatus. Specifically, it is preferable for the emulsion composition that the storage elasticity at an angular frequency of 10 rad/s (10 radians per second) falls within a range between 100 Pa or more and 10,000 Pa or less, more preferably a range between 1,000 Pa or more and 10,000 Pa or less, and the loss elasticity falls within a range between 10 Pa or more and 1,000 Pa or less, and more preferably a range between 100 Pa or more and 1,000 Pa or less. The storage elasticity and the loss elasticity can be measured by a method described later in Example 2.

The composition of the present disclosure may have a storage elasticity within a predetermined range from the viewpoint of obtaining excellent emulsion stability. More specifically, the lower limit of the storage elasticity at an angular frequency of 10 rad/s may be 10 Pa or more. The lower limit may be 20 Pa or more, 30 Pa or more, 40 Pa or more, 50 Pa or more, 100 Pa or more, 200 Pa or more, 300 Pa or more, 400 Pa or more, 500 Pa or more, 600 Pa or more, 700 Pa or more, 800 Pa or more, 900 Pa or more, or 1,000 Pa or more. On the other hand, the upper limit is not particularly limited, but is usually 50,000 Pa or less, more preferably 30,000 Pa or less, even more preferably 10,000 Pa or less, yet even more preferably 8,000 Pa or less, and particularly preferably 6,000 Pa or less from the viewpoint of industrial advantage. Further, the above-mentioned requirements may be satisfied in the state before heating, but it is preferable that both compositions before and after heating at 80° C. for 30 minutes have the above-mentioned characteristics.

The composition of the present disclosure may have a loss elasticity within a predetermined range from the viewpoint of obtaining a smooth emulsion composition. More specifically, the lower limit of the loss elasticity at an angular frequency of 10 rad/s may be 10 Pa or more. The lower limit may be 20 Pa or more, 30 Pa or more, 40 Pa or more, 50 Pa or more, or 100 Pa or more. The upper limit is not particularly limited, but preferably 5,000 Pa or less, more preferably 3,000 Pa or less, and particularly preferably 1,500 Pa or less from the viewpoint of industrial advantage. Further, the above-mentioned requirements may be satisfied in the state before heating, but it is preferable that both compositions before and after heating at 80° C. for 30 minutes have the above-mentioned characteristics.

The composition of the present disclosure may have a loss tangent within a predetermined range from the viewpoint of obtaining a composition having excellent heat resistance. Specifically, the upper limit of the loss tangent at an angular frequency of 10 rad/s of the composition of the present disclosure may be 3.5 or less. The upper limit may be 3.0 or less, 2.5 or less, 2.0 or less, 1.5 or less, 1.0 or less, 0.50 or less, 0.40, or 0.30 or less. The lower limit is not particularly limited, but preferably 0.05 or more, and more preferably 0.10 or more from the viewpoint of industrial advantage. Further, the above-mentioned requirements may be satisfied in the state before heating, but it is preferable that both compositions before and after heating at 80° C. for 30 minutes have the above-mentioned characteristics.

In the present disclosure, the loss tangent of the composition means the degree of liquid property and solid property of the composition, and the larger the value, the stronger the liquid property. The loss tangent can be obtained by measuring the storage elasticity and the loss elasticity with a dynamic viscoelasticity measuring apparatus. Specifically, the storage elasticity, the loss elasticity, and the loss tangent at an angular frequency of 10 rad/s can be measured by the method described below in Example 2.

The composition of the present disclosure may satisfy one or more, two or more, or all of the aforementioned preferred ranges of storage elasticity, loss elasticity, and loss tangent.

(Raw Material) The emulsion composition of the present embodiment includes a dry powder of dicotyledonous plant seeds as a raw material. The dicotyledonous plant may be a leguminous plant (crop belonging to Fabaceae in biological classification) and/or an edible plant classified as a legume or a seed.

The leguminous plant seed may be any seed as long as it contains 11S protein, and specific examples thereof include soybeans, kidney beans (*Phaseolus vulgaris*), kidney beans, red kidney beans, white kidney beans, black beans, mottled kidney beans, tiger beans, lima beans, safflower beans, peas (*Pisum sativum*), pigeon peas, mung beans, cowpeas, red beans, fava beans, chickpeas (*Cicer arietinum*), lentils, peanuts, lupine beans, grass peas, locust beans, stink beans, *Parkia biglobosa*, coffee beans, cocoa beans, and Mexican pigeon peas.

In addition to legumes, seeds of dicotyledonous plants containing 11S protein may also be used, such as okra, Jew's mallow, pumpkin, cucumber, carrot, spinach, rape, radish, cabbage, horseradish, burdock, lettuce, perilla, tomato, eggplant, green pepper, sugar beet, coffee tree, mango, avocado, walnut, fig, grape, sweet potato, chestnut, sunflower, sesame, rape flower, buckwheat, almond, and cashew nut.

The raw material may be an edible plant classified as a legume or a seed among dicotyledonous plant seeds containing 11S protein. Specifically, for example, by referring to legumes and seeds among the classifications listed in the "Standard Tables of Food Composition in Japan 2015 (Seventh Revised Version) Supplementary Edition 2018" (Tables of Food Composition established by the Ministry of Health, Labor and Welfare, see especially Table 1 on page 236), it is possible to understand what edible plants fall under these classifications. Among the above raw materials, almonds, cashew nuts, and peanuts are preferable as the seeds. Red beans, kidney beans, mung beans, and soybean seeds are preferred as legumes, mung beans and soybean seeds are even more preferred, and soybean seeds are especially preferred. However, since 11S protein undergoes a maturation process for accumulation, the content in immature seeds such as green soybeans is low, and it is preferable to use mature seeds. One kind of the raw materials may be used alone, or two or more kinds thereof may be used in combination.

(Micronized Powder) The raw material needs to be used as a micronized powder. Specifically, the upper limit of the average particle size thereof may be 150 µm or smaller. The upper limit may be 130 µm or smaller, 120 µm or smaller, 110 µm or smaller, 100 µm or smaller, 90 µm or smaller, 80 µm or smaller, or 70 µm or smaller. Although it is possible to obtain an emulsion composition even with a powder having an average particle size of more than 150 µm, the aqueous layer tends to separate. In addition, powders having an average particle size of more than 150 µm are not easily soluble in water. It is assumed that proteins are less likely to be eluted from powders with coarse particles. Therefore, it is preferable to increase the proportion of particles having a relatively small diameter so that the average particle size falls within the above ranges. Therefore, the average particle size should be large enough to elute proteins, and the lower limit is not limited. From the viewpoint of industrial convenience, the lower limit is normally 0.2 µm or larger, more preferably 0.3 µm or larger, more preferably 1 µm or larger, more preferably 5 µm or larger, even more preferably 10 µm or larger, yet even more preferably 15 µm or larger, yet even more preferably 20 µm or larger, yet even more preferably 25 µm or larger, and yet even more preferably 30 µm or larger.

The average particle size in this disclosure represents the particle size where the cumulative frequency % of larger and smaller particles in the particle size distribution when dividing into two according to a certain particle size, which is equal, and is also referred to as "d50". All particle sizes in this disclosure are measured on a volumetric basis, and unless otherwise specified, particle size measurements represent the results obtained by analyzing samples after ultrasonic treatment. In the present disclosure, unless otherwise specified, "ultrasonic treatment" refers to the treatment of applying an ultrasonic wave having a frequency of 30 kHz to a measurement sample in a measurement solvent at an output of 40 W for 3 minutes. The specific average particle size can be measured in the same manner as in Preparation Example 1 described later using a general laser diffraction particle size analyzer.

The measurement of each analytical item (average particle size, 11S protein, cellulose, fat and oil, acetic acid, etc.) in the emulsion composition of the present disclosure is performed excluding ingredients having a particle size of 2,000 µm or larger, which do not contribute to the emulsification of the composition and are not subject to measurement of the particle size distribution. Specifically, 100 g of the composition is passed through 9 mesh (Tyler mesh), and the passed fraction is used as the emulsion composition and measured for each analytical item. The residue on the mesh after passing through the 9 mesh is allowed to stand for a sufficient period of time, and the food particles smaller than the apertures of the 9 mesh are sufficiently passed through the mesh using a spatula or the like in such a manner that does not change the particle size of the composition, thereby obtaining the passed fraction.

The means for micronizing the raw material is not particularly limited as long as it can prepare a raw material powder having an average particle size within the above range while suppressing thermal denaturation of protein. Specifically, first, the surface of the raw material is dried. The drying method may be any method used for drying general foods. This is because even when the surface is dried by heat, the activity of the protein inside the seed is usually maintained. Examples of the drying method include sun drying, shade drying, air drying (for example, hot air drying, fluidized bed drying, spray drying, drum drying, and low-temperature drying), pressure drying, reduced pressure drying, microwave drying, and oil heat drying. Among them, air-drying is preferable because it is easier to adjust the moisture content. Next, the dried raw material is micronized to obtain a powder. The means for micronization is not particularly limited, and examples thereof include pulverization methods such as shearing and collision. Here, from the viewpoint of suppressing thermal denaturation of proteins, the temperature during micronization may be 40° C. or lower, or 10° C. or higher and 35° C. or lower. Furthermore, in order to increase the ratio of particles with smaller particle sizes, sieving may be performed using a sieve with appropriate apertures.

(11S Protein) Instead of the above raw materials, 11S protein itself may be used as an emulsifier. 11S protein is a protein having a molecular weight of 30 to 40 kDa as measured by SDS-PAGE, and can be fractionated (purified) from soybeans using known methods (see Patent Literatures 3 and 4, Non-Patent Literature 1, pages 440 to 447, for example). As mentioned above, 11S protein is also found in the seeds of legumes and other dicotyledonous plants other than soybeans (for example, seeds of edible plants classified as legumes or seeds). Specifically, 11S protein can also be purified from the raw materials listed above using known methods.

Since it is sufficient that 11S protein in the active state is contained in a predetermined concentration at the time of emulsification treatment, the fractionated (purified) 11S protein may be used, or a raw material containing 11S protein may be directly added. For example, the protein content of soybeans is about 35%, and 11S protein accounts for about 41% of that (see Non-Patent Literature 1). Therefore, an emulsion composition including 7 mass % of dry soybean powder contains about 1 mass % of 11S protein. Alternatively, a protein extract made by impregnating the above raw material containing 11S protein with water may be used as an emulsifier. For example, soymilk prepared by removing a fiber component from a soybean protein extract can be preferably used. However, it is preferable to use unadjusted soymilk with a low thermal history. In a case using 11S protein extracted from the raw material and a case directly adding a raw material containing 11S protein, the average particle size of the raw material may be within the afore-mentioned range.

(Cellulose) When 11S protein is used as an emulsifier instead of the above raw material powder, it is preferable to use cellulose in combination with 11S protein. This is because the stability of the emulsion composition tends to be improved as the cellulose content increases. Cellulose refers to insoluble polysaccharides that constitute the cell walls of plants. Since cellulose is insoluble in alkaline solutions, it is the fraction that precipitates when plant dietary fiber is extracted with alkali. For example, okara of soybean can also be used as cellulose. Okara refers to the residue left over from squeezing soymilk in the process of making tofu (bean curd) from soybeans. The cellulose that the raw material contains may be used as it is (for example, as okara), or refined cellulose may be used. The crushing size (average particle size), heating, thermal history, drying, and wetting conditions of the above cellulose and okara are not limited.

(Fat and Oil) The emulsion composition of the present embodiment may further include fat and oil. Examples of the fat and oil include edible fats and oils, various fatty acids, organic solvents, and foods containing them as raw materials. The edible fats and oils are preferable among them. For example, sesame oil, rapeseed oil (canola oil), soybean oil, palm oil, palm kernel oil, palm fractionated oil, cottonseed oil, corn oil, sunflower oil, safflower oil, olive oil, flaxseed oil, rice oil, camellia oil, flavor oil, coconut oil, grape seed oil, peanut oil, almond oil, avocado oil, fish oil, medium chain fatty acid triglycerides, diacylglycerol, ester exchange oil, milk fat, and gee may be used. Vegetable fats and oils are preferred because they do not contain cholesterol. It is more preferable to use an edible oil having liquid-like flowability at room temperature (20° C., unless otherwise stated). Specifically, the oil may have a Bostwick viscosity (measured distance of sample flowing down in the trough at a given temperature for a given time) of 10 cm or more, 15 cm or more, or 28 cm or more at 20° C. for 10 seconds on a Bostwick viscometer (in the present disclosure, a viscometer with a trough length of 28.0 cm and a Bostwick viscosity, i.e., a maximum flow distance of 28.0 cm of sample in the trough). In the present disclosure, it is also preferred that the fat and oil portion in the emulsion composition (for example, the fat and oil component released when centrifuging the emulsion composition at 15000 rpm for 1 minute) has liquid-like flowability (specifically, Bostwick viscosity of 10 cm or more, more preferably 15 cm or more, and even more preferably 28 cm or more at 20° C. for 10 seconds on a Bostwick viscometer). In the case that an edible fat and oil containing the above-mentioned edible oil having liquid-like flowability is used, it is preferable that 90 mass % or more, particularly 92 mass % or more, even more preferably 95 mass % or more, and particularly preferably 100 mass % of the total fat and oil is the liquid oil.

(Acetic Acid) When preparing a composition having mayonnaise-like properties as one or more embodiments of emulsion composition, the emulsion composition may further include acetic acid. Acetic acid may be added directly, or acetic acid-containing drinks such as rice vinegar, grain vinegar, distilled vinegar, apple vinegar, grape vinegar, synthetic vinegar, black vinegar, Chinese vinegar, and balsamic vinegar may be added.

(Blending Amount) In the emulsion composition including the above raw material powder and water (emulsion composition including no fat, oil, and acetic acid), the blending amount of the raw material powder may be in a range between 1 mass % or more and 30 mass % or less, preferably in a range between 1 mass % or more and 20 mass % or less, and more preferably in a range between 2 mass % or more and 15 mass % or less in terms of a dried product. The blending amount of water may be in a range between 50 mass % or more and 99 mass % or less, preferably in a range between 70 mass % or more and 99 mass % or less, and more preferably in a range between 75 mass % or more and 98 mass % or less. In a case that 11S protein and cellulose are used instead of the raw material powder, a considerable amount of 11S protein and cellulose contained in the above-mentioned blending amount of the raw material powder may be blended. For example, the blending amount of 11S protein may be in a range between 0.14 mass % or more and 6.0 mass % or less, preferably in a range between 0.14 mass % or more and 4.0 mass % or less, and more preferably in a range between 0.2 mass % or more and 3.0 mass % or less. The blending amount of cellulose may be in a range between 0.02 mass % or more and 3.0 mass % or less, preferably in a range between 0.02 mass % or more and 2.5 mass % or less, and more preferably in a range between 0.02 mass % or more and 2.0 mass % or less. When okara is used instead of cellulose, the blending amount of okara is in a range between 0.4 mass % or more and 7.5 mass % or less, preferably in a range between 0.4 mass % or more and 6.3 mass % or less, and more preferably in a range between 0.4 mass % or more and 5.0 mass % or less in terms of a dried product.

In the emulsion composition including the above raw material powder, water, and the fat and oil, the blending amount of the raw material powder may be in a range between 1 mass % or more and 20 mass % or less, preferably in a range between 1 mass % or more and 15 mass % or less, and more preferably in a range between 1 mass % or more and 12 mass % or less in terms of a dried product. The blending amount of water may be in a range between 20 mass % or more and 69 mass % or less, preferably in a range between 25 mass % or more and 65 mass % or less, and more preferably in a range between 30 mass % or more and 60 mass % or less. The blending amount of the fat and oil may be in the range of 21 mass % or more and 70 mass % or less, preferably in a range between 23 mass % or more and 60 mass % or less, and more preferably in a range between 25 mass % or more and 50 mass % or less. If the blending amount of the fat and oil is more than 70 mass %, emulsification does not occur, which is not preferable. When the blending amount of the fat and oil is 30 mass % or more, an emulsifying effect is exhibited and an emulsion composition having mayonnaise-like properties is obtained, which is more preferable. When 11S protein and cellulose are used instead of the raw material powder, a considerable amount of 11S protein and cellulose contained in the above-mentioned blending amount of the raw material powder should be blended. The blending amount of 11S protein may be in a range between 0.14 mass % or more and 4.0 mass % or less, preferably in a range between 0.14 mass % or more and 3.0 mass % or less, and more preferably in a range between 0.2 mass % or more and 2.4 mass % or less. The blending amount of cellulose may be in a range between 0.02 mass % or more and 2.0 mass % or less, preferably in a range between 0.02 mass % or more and 1.5 mass % or less, and more preferably in a range between 0.02 mass % or more and 1.2 mass % or less. When okara is used instead of cellulose, the blending amount of okara is in a range between 0.4 mass % or more and 5.0 mass % or less, preferably in a range between 0.4 mass % or more and 4.0 mass % or less, and more preferably in a range between 0.4 mass % or more and 3.0 mass % or less in terms of a dried product.

In the emulsion composition including the raw material powder, water, the fat and oil, and acetic acid, the blending amount of the raw material powder may be in a range between 1 mass % or more and 20 mass % or less, preferably in a range between 1 mass % or more and 15 mass % or less, and more preferably in a range between 1 mass % or more and 12 mass % or less in terms of a dried product. The blending amount of water may be in a range between 20 mass % or more and 69 mass % or less, preferably in a range between 25 mass % or more and 65 mass % or less, and more preferably in a range between 30 mass % or more and 60 mass % or less. The blending amount of the fat and oil may be in the range of 21 mass % or more and 70 mass % or less, preferably in a range between 23 mass % or more and 60 mass % or less, and more preferably in a range between 25 mass % or more and 50 mass % or less. If the blending amount of the fat and oil is more than 70 mass %, emulsification does not occur, which is not preferable. When the blending amount of the fat and oil is 25 mass % or more, an emulsifying effect is exhibited and an emulsion composition having mayonnaise-like properties is obtained, which is more preferable. The blending amount of acetic acid may be more than in a range between 0 mass % and less than 50 mass %, preferably in a range between 0.1 mass % or more and less than 20 mass %, and more preferably in a range between 0.2 mass % or more and less than 10 mass % in terms of the concentration of glacial acetic acid. When 11S protein and cellulose are used instead of the raw material powder, a considerable amount of 11S protein and cellulose contained in the above-mentioned blending amount of the raw material powder should be blended. For example, the blending amount of 11S protein may be in a range between 0.14 mass % or more and 4.0 mass % or less, preferably in a range between 0.14 mass % or more and 3.0 mass % or less, and more preferably in a range between 0.2 mass % or more and 2.4 mass % or less. The blending amount of cellulose may be in a range between 0.02 mass % or more and 2.0 mass % or less, preferably in a range between 0.02 mass % or more and 1.5 mass % or less, and more preferably in a range between 0.02 mass % or more and 1.2 mass % or less. When okara is used instead of cellulose, the blending amount of okara is in a range between 0.4 mass % or more and 5.0 mass % or less, preferably in a range between 0.4 mass % or more and 4.0 mass % or less, and more preferably in a range between 0.4 mass % or more and 3.0 mass % or less in terms of a dried product.

(Emulsification Treatment) The emulsion composition of the present embodiment is obtained by emulsifying a mixture obtained by blending the ingredients such as the raw material powder and water. The emulsification treatment may be performed using, for example, a high-pressure or ultrasonic homogenizer capable of strong emulsification treatment.

Among them, a high-pressure homogenizer is particularly preferred because it produces a highly stable emulsion composition. The high-pressure homogenizer may be any device capable of shearing at 1 MPa or higher. For example, a high-pressure homogenizer LAB2000 (manufactured by SMT Co., Ltd.) may be used. A suitable pressure for preparing a composition having mayonnaise-like properties is 20 MPa or higher. For the stability of the emulsion composition, the pressure may be 40 MPa or higher, or 80 MPa or higher. Since the emulsion composition becomes hard when the pressure is increased, the pressure may be adjusted according to the properties of the desired emulsion composition. To prevent the device from overheating, the temperature of the liquid feeding part may be controlled to a low temperature of about 4° C., for example. The sample temperature may also be maintained at 40° C. or lower, or in a range between 10° C. or higher and 35° C. or lower, from the viewpoint of suppressing thermal denaturation of the protein. To control the sample temperature, for example, the sample may be cooled by water or ice water before treatment.

The ultrasonic homogenizer may be any device capable of giving strong energy to the interface and generating cavitation. For example, SONIFIER MODEL 450 (manufactured by Branson) may be used. The treatment time may be at least 2 minutes or more, 4 minutes or more, or 5 minutes or more in order to apply ultrasonic waves uniformly to the object to be emulsified. The frequency is not limited as long as cavitation occurs. The temperature may be maintained at 40° C. or lower, or in a range between 10° C. or higher and 35° C. or lower from the viewpoint of suppressing thermal denaturation of the protein.

(Sterilization Treatment) The emulsion composition of the present embodiment can be obtained by the above emulsification treatment, but is desirably subjected to sterilization treatment after the emulsification treatment in order to prevent deterioration of quality. In general, proteins are denatured by heat treatment, and their emulsifying power is reduced. However, in an emulsion composition including the raw material powder, water, the fat and oil (and acetic acid), by mixing the above raw material powder with other ingredients and performing a strong emulsification treatment, emulsion stability is maintained even after subsequent heat treatment (sterilization). Therefore, the conditions of the sterilization treatment in the present embodiment may be the same as those for general food and beverages, to the extent that the effects of this disclosure and the original flavor of the emulsion composition are not impaired. For example, the heat treatment may be performed in a range between 65° C. or higher and 121° C. or lower for a period in a range between 4 minutes or more and 40 minutes or less.

On the other hand, the emulsion composition including the above raw material powder and water (one or more embodiments containing no fat and oil, and acetic acid) cannot be sterilized because it has low thermal stability and its emulsified state is lost by heat treatment at high temperature. Therefore, the emulsion composition of the embodiments needs to be stored and distributed at a low temperature of 10° C. or lower, preferably 4° C. or lower to prevent quality deterioration. In any of the above embodiments, other treatments such as purification, concentration, freezing, and pulverization may be performed.

(Other Food Components and Additives) The emulsion composition of the present embodiment may include any food components or additives commonly used for producing an emulsion composition, in addition to the above-mentioned raw material powder, water, the fat and oil, and acetic acid. Examples of the ingredients and additives include citrates such as trisodium citrate, phosphates such as sodium metaphosphate, sodium pyrophosphate, and sodium polyphosphate, colorants such as (3-carotene, antioxidants such as extracted tocopherols and L-ascorbic acid palmitate, flavoring such as milk flavor, vanilla flavor, and orange oil, monosaccharides such as xylose, glucose, and fructose, disaccharides such as sucrose, lactose, and malt sugar, starch decomposition products such as dextrin and starch syrup, polysaccharides such as oligosaccharides and starch, sugar alcohols such as sorbitol, mannitol, maltitol, and reducing syrup, processed starches such as phosphoric acid cross-linked starch, and thickening stabilizers such as water-soluble hemicellulose, gum arabic, carrageenan, karaya gum, xanthan gum, guar gum, tamarind seed gum, tragacanth gum, pectin, and locust bean gum. The content of the above ingredients in the final emulsion composition may be in a range between 0.01 mass % or more and 50 mass % or less, preferably in a range between 0.1 mass % or more and 30 mass % or less, and more preferably in a range between 0.3 mass % or more and 20 mass % or less. These food components and additives may be added at any stage of the manufacturing process of the emulsion composition and may be before or after the emulsification treatment.

The addition of the emulsion composition of the present embodiment to other foods and drinks improves their emulsion stability, and allows the production of emulsified foods having excellent properties such as smoothness, melting in the mouth, shape retention, and refrigeration/freezing resistance. Examples of other food and beverage products include ice cream, whipped cream, custard cream, mayonnaise, compositions having mayonnaise-like properties, coffee cream, coffee beverages, oil-in-water emulsified foods such as flour paste, butter, margarine, spreads, chocolate, and other oil-in-water emulsified foods. The blending amount of the emulsion composition in the final emulsified food is not particularly limited, but may be in a range between 20 mass % or more and 99 mass % or less, preferably in a range between 20 mass % or more and 80 mass % or less, and more preferably in a range between 20 mass % or more and 60 mass % or less, for example.

(Emulsion Stability) The emulsion composition including the raw material powder, water, the fat and oil (and acetic acid) is excellent in emulsion stability and has high thermal stability. The emulsion stability (thermal stability) can be evaluated by an accelerated test in which the emulsion stability is tested by centrifugation after the heat treatment. Specifically, the emulsion composition is subjected to heat treatment at 80° C. for 30 minutes, and the resulting heat-treated product is placed in a centrifuge tube and centrifuged at 30 G for 3 minutes at room temperature (about 25° C.) to check whether the emulsified state is maintained or not.

On the other hand, an emulsion composition including the above raw material powder and water (one or more embodiments containing no fat and oil, and acetic acid) has also low thermal stability, but has excellent emulsion stability, as good as that of known emulsified foods that cannot withstand the heat treatment. Here, the evaluation of the emulsion stability can be performed by confirming whether or not the emulsified state is maintained when the emulsion composition is allowed to stand at room temperature (about 25° C.) for 30 minutes.

In any embodiments, the emulsion stability after centrifugation or standing is checked by visually checking whether the aqueous layer and oil layer are separated, and if the aqueous layer and oil layer are not separated, it can be evaluated as "having excellent emulsion stability.

EXAMPLES

Hereinafter, one or more embodiments of the present disclosure will be described with reference to examples and the like, but the present disclosure is not limited to these examples. Each analytical value is for the passed fraction after passing 100 g of the composition through 9 mesh (Tyler mesh).

Figure 2:
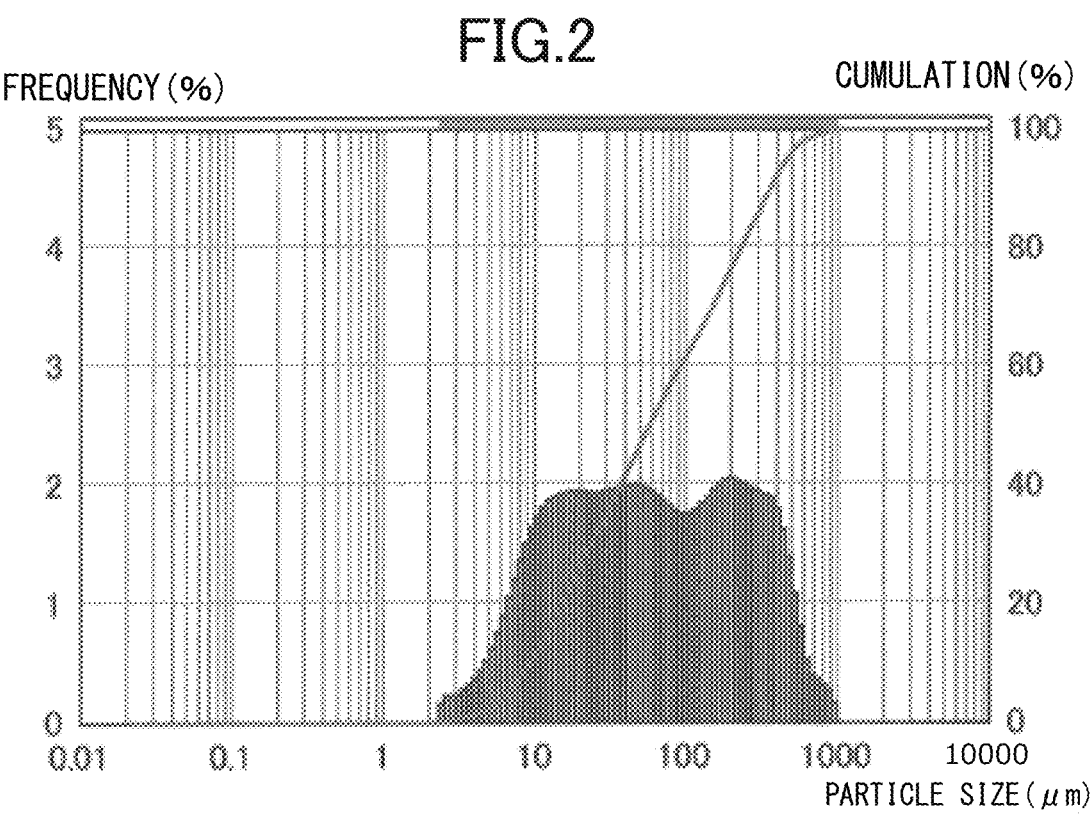
FIG. 2 shows the particle size distribution of the dry soybean powder having an average particle size of 129 µm measured with the laser diffraction particle size analyzer (Preparation Example 1).

(Preparation Example 1) Preparation of dry soybean powder. Dried whole soybeans were ground to the average particle size of 35 μm to prepare dry soybean powder having the average particle size of 35 μm (FIG. 1). To suppress the temperature rise during grounding, the grounding process was performed at 10° C. or higher and 35° C. or lower using a dry jet mill. Similarly, dry soybean powder having the average particle size of 129 μm was prepared (FIG. 2). Commercially available soybean powder (manufactured by Nishio Seifun Co., Ltd.) having the average particle size of 198 μm was used as dry soybean powder having the average particle size of 198 μm (FIG. 3).

The average particle size of each dry soybean powder was measured with a laser diffraction particle size analyzer (Microtrac MT3300 EXII, manufactured by MicrotracBEL Corp.). Ethanol was used as the solvent for measurement, and DMS2 (Data Management System version II, manufactured by MicrotracBEL Corp.) was used as the measurement application software. First, the cleaning button of the measurement application software was pressed to clean the product, and then the Set Zero button of the software was pressed to perform zero adjustment, and the sample was directly charged until it was within the appropriate concentration range by sample loading. Next, the ultrasonic processing button of the same software was pressed to perform ultrasonic processing at 30 kHz and 40 W for 180 seconds, and defoaming treatment was performed three times. The results of laser diffraction at a flow rate of 50% with a measurement time of 10 seconds were used as measurements. The measurement conditions were set to as follows: distribution display: volume; particle refractive index: 1.60; solvent refractive index: 1.36; measurement upper limit (μm): 2000; and measurement lower limit (μm): 0.021.

Figure 3:
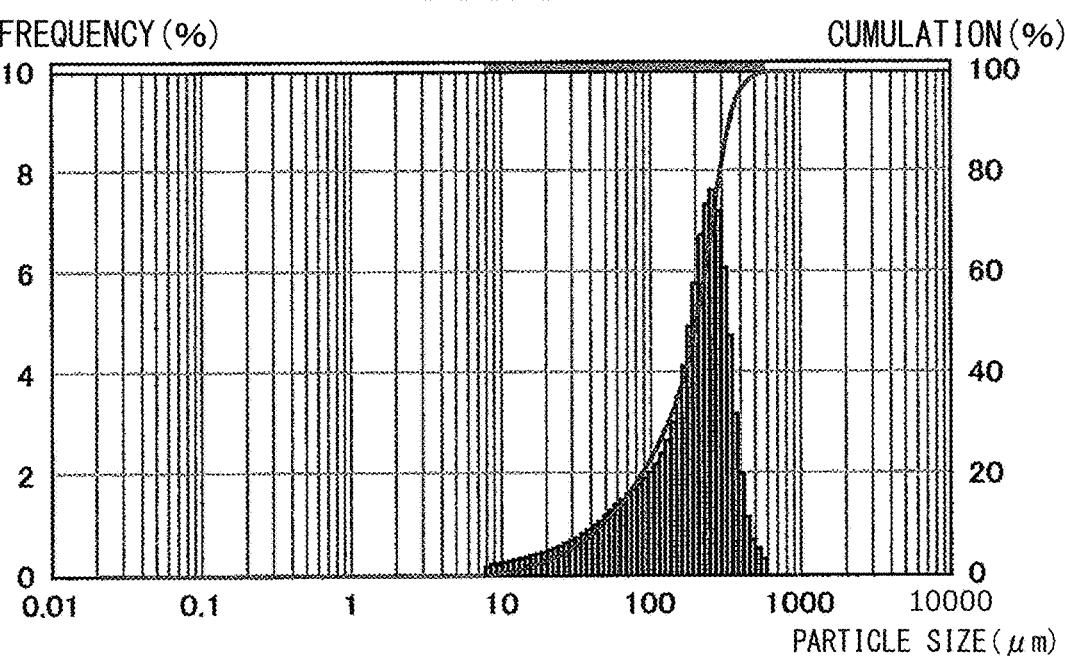
FIG. 3 shows the particle size distribution of the dry soybean powder having an average particle size of 198 µm measured with the laser diffraction particle size analyzer (Preparation Example 1).

FIGS. 1, 2 and 3 show the results of particle size distribution measurement by a laser diffraction particle size analyzer for dry soybean powder having the average particle size of 35 μm, dry soybean powder having the average particle size of 129 μm, and dry soybean powder having the average particle size of 198 μm, respectively.

Figure 4:
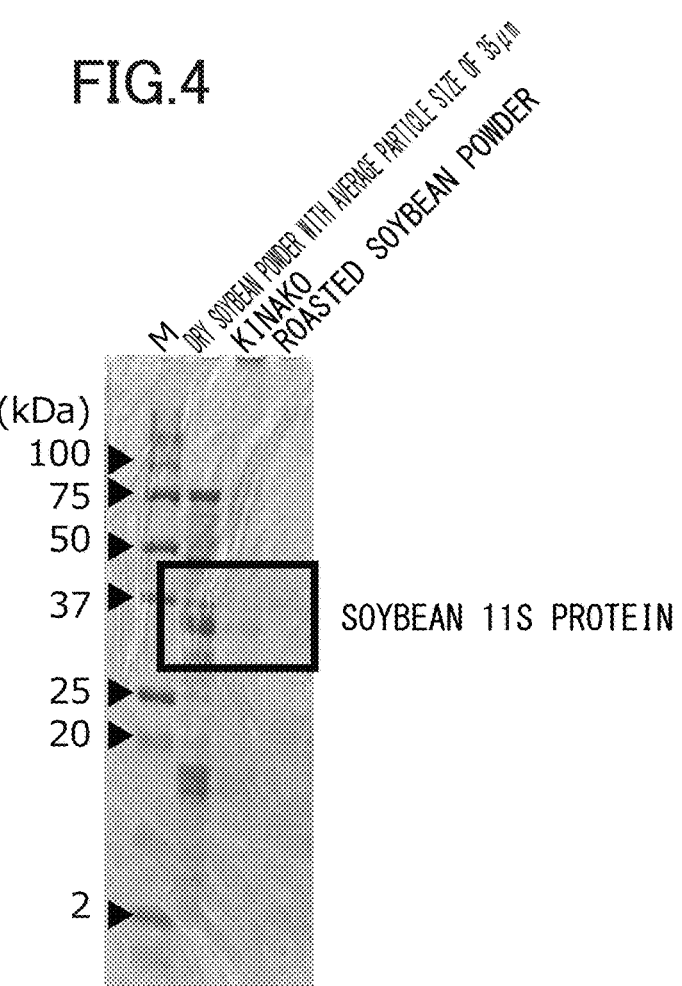
FIG. 4 is an electrophoresis image showing the results of SDS-PAGE on aqueous suspensions of dry soybean powder having the average particle size of 35 µm, kinako (flour made from roasted soybeans) (comparative example), and roasted soybean powder (comparative example). In the image, M (molecular weight marker), dry soybean powder having the average particle size of 35 µm, kinako, and roasted soybean powder are shown in order from left to right (Example 4).

(Example 1) Emulsion composition prepared from 11S protein and cellulose. Whole soybeans contain about 35% protein, of which 11S protein is considered to account for 41% (see, for example, Non-Patent Literature 1). Therefore, it is estimated that dry soybean powder contains about 14% of 11S protein, and a composition containing 7% of dry soybean powder contains about 1% of 11S protein. It is known that a 30-40 kDa band is detected when 11S protein is subjected to SDS-PAGE (see, for example, Non-Patent Literature 1). Therefore, an aqueous suspension of the dry soybean powder having the average particle size of 35 μm obtained in Preparation Example 1 was subjected to SDS-PAGE, and a band was detected at 30 to 40 kDa (FIG. 4). Therefore, the dry soybean powder having the average particle size of 35 μm is considered to contain 11S protein. FIG. 4 is an electrophoretic image showing the results of SDS-PAGE of an aqueous suspension of the dry soybean powder having the average particle size of 35 kinako, and roasted soybean powder in Example 4 described below. In FIG. 4, in order from left to right, M (molecular weight marker), dry soybean powder having the average particle size of 35 kinako, and roasted soybean powder are shown.

In accordance with the literature (page 444 of Non-Patent Literature 1), 11S protein was fractionated from the dry soybean powder having the average particle size of 35 μm. Details will be described below. Three times the amount (1,500 g) of ethanol was added to 500 g of dry soybean powder having the average particle size of 35 and the ethanol was removed by filtration. The above process was done three times and then dried to complete defatting. Eight times the amount of pure water by mass was added to the defatted soybean powder, and the soybean powder was adjusted to pH 8.0 with a 5N NaOH aqueous solution and extracted at room temperature (about 25° C., same hereinafter) for 1 hour, then the extract was centrifuged (3,000 G, 10 minutes, room temperature) to be separated into a supernatant (1) and a precipitate (1). Five times the volume of pure water by mass was added to the precipitate (1), extracted at room temperature for one hour, and then the extract was centrifuged (3,000 G, 10 minutes, room temperature) to be separated into a supernatant (2) and a precipitate (2). The supernatant (2) was combined with the supernatant (1) to make soymilk, which was adjusted to pH 5.8 by adding sodium chloride of 1 mM and sulfuric acid of 3.5 N, and then centrifuged (3,000 G, 10 min, room temperature), and the resulting precipitate was used as an 11S protein fraction.

Next, a cellulose-rich fraction was extracted from the precipitate obtained in the process of fractionation of the 11S protein described above. Details will be described below. The precipitates (1) and (2) were combined and suspended in a 10-fold volume of 0.1 N NaOH by mass, heated at 80° C. for 30 minutes, and centrifuged (5000 G, 10 minutes, room temperature) to obtain a precipitate. This operation was repeated until the precipitate became white, and the resulting precipitate was used as the cellulose-rich fraction (hereinafter referred to as the "cellulose fraction"). A cellulose fraction (0.86%) having a dry mass of 1.2 g was obtained from 140 g of the dry soybean powder having the average particle size of 35 μm.

Seven parts by mass of the dry soybean powder having the average particle size of 35 μm (containing 1 part by mass of 11S protein and 0.06 parts by mass of cellulose-rich fraction) was suspended in 46.5 parts by mass of water. The suspension was mixed with 46.5 parts by mass of rapeseed oil, and the mixture was emulsified (1 pass) at room temperature using a high-pressure homogenizer at 80 MPa to prepare an emulsion. In addition, 1 part by mass (dry matter equivalent) of the 11S protein fraction and 0.06 parts by mass (dry matter equivalent) of the cellulose fraction fractionated above were suspended in 49.47 parts by mass of water, the suspension was mixed with 49.47 parts by mass of rapeseed oil, and the mixture was emulsified in the same manner as described above to prepare an emulsion. The two emulsions obtained in this way each exhibited mayonnaise-like properties.

Figure 5:
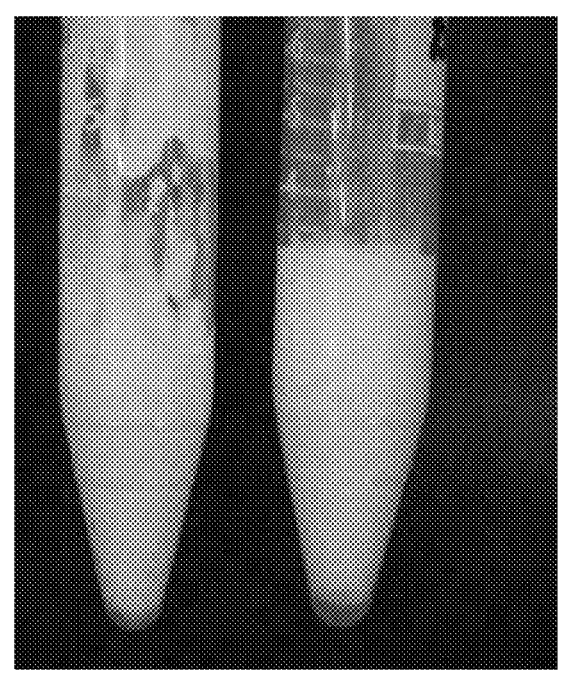
FIG. 5 is a photograph showing the stability of various emulsions. In the photograph, the left side shows the result of centrifugation at 30 G for 3 minutes on an emulsion prepared from the dry soybean powder having the average particle size of 35 μm, and the right side shows that the result of centrifugation at 30 G for 3 minutes on an emulsion prepared from 11S protein and cellulose (Example 1).

To examine the stability of the emulsion, each emulsion was centrifuged at 30 G at room temperature for 3 minutes, and as a result, neither the aqueous layer nor the oil layer was separated. The results are shown in FIG. 5. In FIG. 5, the left side of the photograph shows the result of centrifugation at 30 G for 3 minutes on the emulsion prepared from the dry soybean powder having the average particle size of 35 μm obtained in Preparation Example 1, and the right side of the photograph shows that on an emulsion prepared from 11S protein and cellulose.

From these results, it was found that the physical properties of the emulsion composition of the dry soybean powder having the average particle size of 35 μm can be reproduced by emulsifying 11S protein and cellulose equivalent to the dry soybean powder having the average particle size of 35 μm instead of the dry soybean powder having the average particle size of 35 μm. This suggests that stable emulsification can be achieved using 11S protein and cellulose (FIG. 5).

Figure 6:
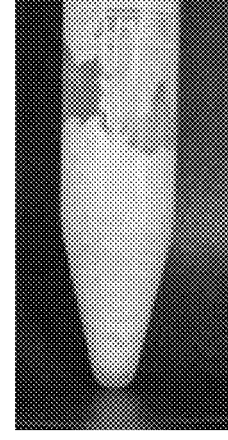
FIG. 6 is a photograph showing emulsion stability after heating of an emulsion prepared from the dry soybean powder having the average particle size of 35 μm (Example 2).

(Example 2) Evaluation of thermal stability of emulsion composition. The emulsion prepared in Example 1 using the dry soybean powder having the average particle size of 35 μm as an emulsifier was heated at 80° C. for 30 minutes and then centrifuged at 30 G for 3 minutes at room temperature to examine emulsion stability. As a result, no separation of the aqueous and oil layers was observed. The result is shown in FIG. 6.

The dynamic viscoelasticity of the emulsion before and after the heat treatment was compared. Dynamic viscoelasticity was measured as follows by using a dynamic viscoelasticity measuring/analyzing device (product name: "Rheometer MCR102", manufactured by Anton Paar GmbH) and a cone-shaped jig (CP50, manufactured by Anton Paar GmbH) or a parallel-shaped jig (PP25, manufactured by Anton Paar GmbH). First, a constant strain to be set was determined by strain dependency test (0.01% or more and 0.1% or less) at a constant frequency (10 rad/s), and then frequency dependency test (1.0 rad/s or more and 100 rad/s or less) was performed. Specifically, in a dynamic viscoelasticity measuring/analyzing device, a sample was placed on a lower disk (φ 60 mm) controlled at 20° C., and the sample was sandwiched between jigs (φ 50 mm or 25 mm) such that a gap or clearance between the jigs and the lower disk was 0.102 mm. A strain dependency test was performed under these conditions to measure the storage elasticity (G'), and the constant strain was determined to be 0.1%. Next, under a load of this constant strain, a frequency dependency test in a frequency range between 1.0 rad/s or more and 100 rad/s or less was performed from a frequency of 100 rad/s or more to a frequency of 1.0 rad/s or less while decreasing the frequency, and a storage elasticity (G'), a loss elasticity (G"), and a loss tangent at an angular frequency of 10 rad/s were measured.

Figure 7:
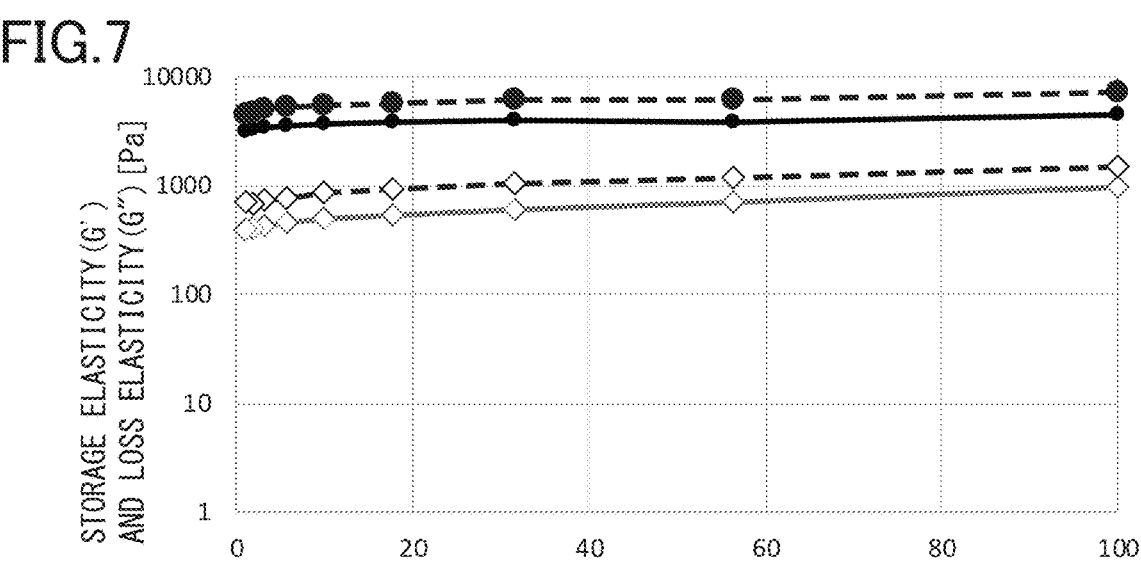
FIG. 7 is a graph showing the effect of heat treatment on the dynamic viscoelasticity of emulsions prepared from the dry soybean powder having the average particle size of 35 μm. In the graph, dots (●) and the solid line represent the storage elasticity (G') of the emulsion before heating at 80° C. for 30 minutes, diamond-shaped marks (◇) and the solid line represent the loss elasticity (G") of the emulsion before heating at 80° C. for 30 minutes, the dots (●) and the dashed line represent the storage elasticity (G') of the emulsion after heating at 80° C. for 30 minutes, and the diamond-shaped marks (◇) and the dashed line represent the loss elasticity (G") of the emulsion after heating at 80° C. for 30 minutes (Example 2).
Figure 7:
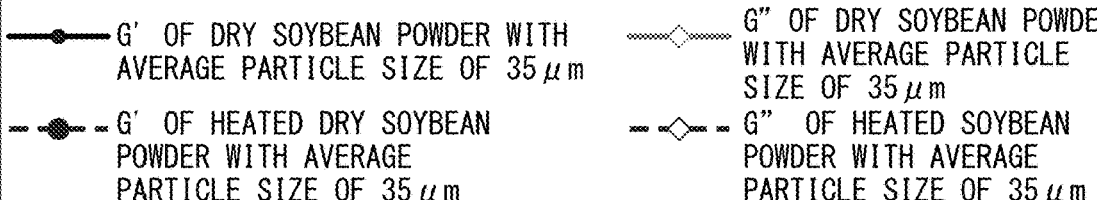

The measurement results are shown in FIG. 7. In FIG. 7, the dots (●) and the solid line represent the storage elasticity (G') of the emulsion before heating at 80° C. for 30 minutes, the diamond-shaped marks (◇) and the solid line represent the loss elasticity (G") of the emulsion before heating at 80° C. for 30 minutes, the dots (●) and the dashed line represent the storage elasticity (G') of the emulsion after heating at 80° C. for 30 minutes, and the diamond-shaped marks (◇) and the dashed line represent the loss elasticity (G") of the emulsion after heating at 80° C. for 30 minutes. The results indicate that the dynamic viscoelasticity of the emulsion was not changed by heating after emulsification (FIG. 7).

The results of the present example indicate that the emulsion stability of the present composition having mayonnaise-like properties is stable against gravity and heating. Therefore, the emulsion composition of the present embodiment can be heated for sterilization.

Figure 8:
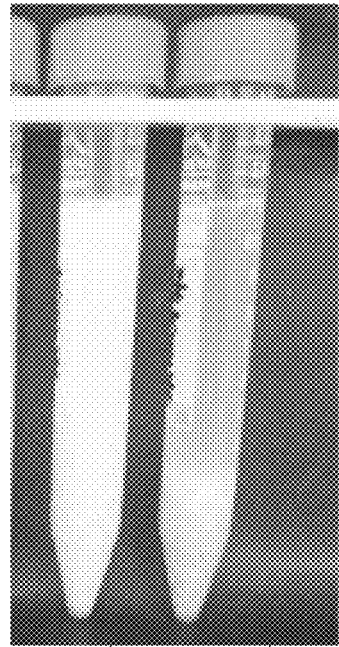
FIG. 8 is a photograph showing the emulsion stability of aqueous suspensions of the dry soybean powder having different particle sizes. In the photograph, the left side shows an aqueous suspension of the dry soybean powder having the average particle size of 35 μm, and the right side shows an aqueous suspension of the dry soybean powder having the average particle size of 198 μm (Example 3).

(Example 3) Emulsion compositions prepared from dry soybean powder of various particle sizes. An emulsion was prepared from the dry soybean powder having the average particle size of 198 μm described in Preparation Example 1 (FIG. 3). Ten parts by mass of the dry soybean powder having the average particle size of 198 μm were suspended in 90 parts by mass of water and left to stand at room temperature for 90 minutes. In addition, the same operation as above was performed using dry soybean powder having the average particle size of 35 μm instead of the dry soybean powder having the average particle size of 198 μm for comparison. As a result, the dry soybean powder having the average particle size of 35 μm remained in mayonnaise-like properties even after being allowed to stand for 90 minutes, but the powder precipitated in the aqueous suspension of the dry soybean powder having the average particle size of 198 μm (FIG. 8). FIG. 8 is a photograph showing the emulsion stability of aqueous suspensions of the dry soybean powder having different particle sizes. In FIG. 8, the left side shows an aqueous suspension of the dry soybean powder having the average particle size of 35 and the right side shows an aqueous suspension of the dry soybean powder having the average particle size of 198 μm.

Figure 9:
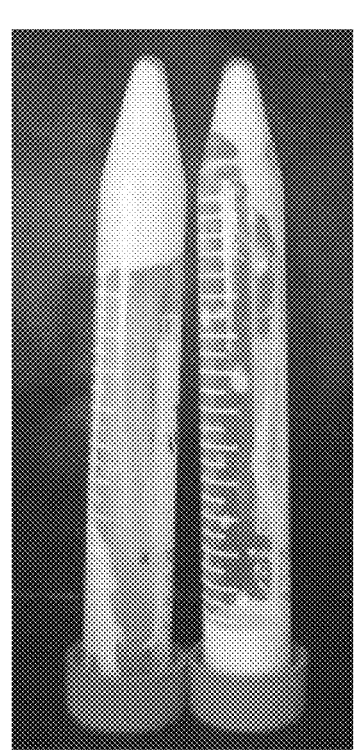
FIG. 9 is a photograph showing the comparison of emulsions in the states immediately after emulsification. In the photograph, the left side shows an emulsion prepared from the dry soybean powder having the average particle size of 35 μm, and the right side shows an emulsion prepared from the dry soybean powder having the average particle size of 198 μm (Example 3).
Figure 10:
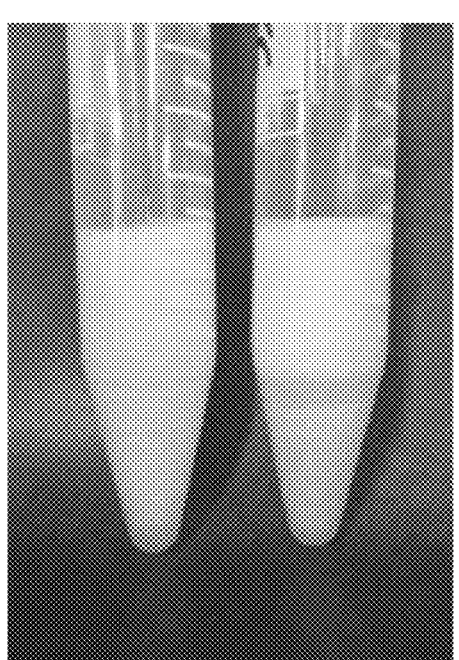
FIG. 10 is a photograph showing the comparison of emulsions in the state after centrifugation at 30 G for 3 minutes at room temperature. In the photograph, the left side shows an emulsion prepared from the dry soybean powder having the average particle size of 35 μm, and the right side shows an emulsion prepared from the dry soybean powder having the average particle size of 198 μm (Example 3).
Figure 11:
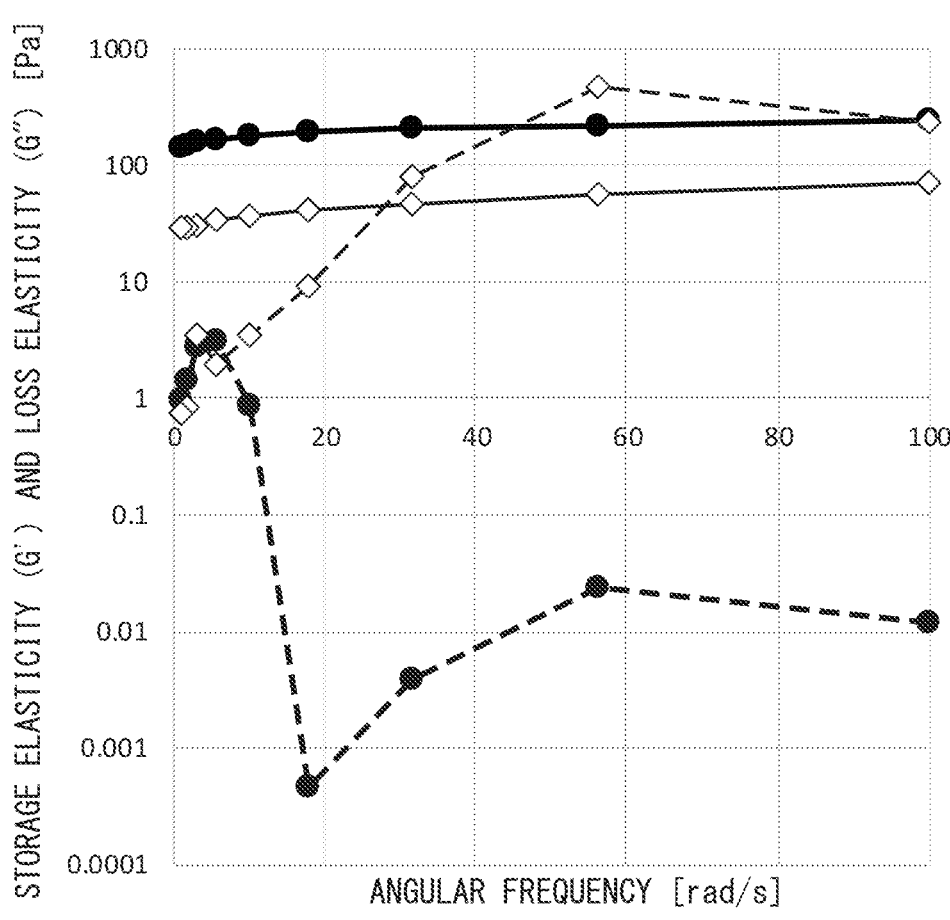
FIG. 11 is a graph of the dynamic viscoelasticity of emulsions. In the graph, the dots (●) and the solid line represent the storage elasticity (G') of the emulsion prepared from the dry soybean powder having the average particle size of 35 μm, the diamond-shaped marks (◇) and the solid line represent the loss elasticity (G") of the emulsion prepared from the dry soybean powder having the average particle size of 35 μm, the dots (●) and the dashed line represent the storage elasticity (G') of the emulsion prepared from the dry soybean powder having the average particle size of 198 μm, and the diamond-shaped marks (◇) and the dashed line represent the loss elasticity (G") of the emulsion prepared from the dry soybean powder having the average particle size of 198 μm. The vertical axis represents the storage elasticity (G') and the loss elasticity (G") (unit: Pa), and the horizontal axis represents the angular frequency (unit: rad/s) (Example 3).
Figure 11:
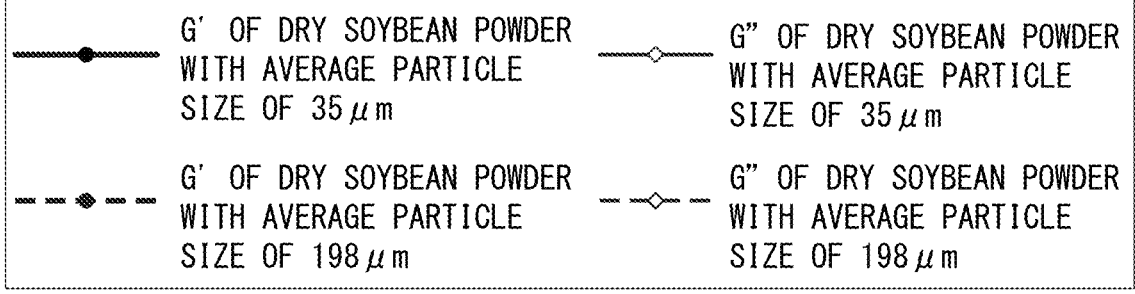

Next, 7 parts by mass of the dry soybean powder having the average particle size of 198 μm, 46.5 parts by mass of water, and 46.5 parts by mass of rapeseed oil were mixed, and the obtained mixture was emulsified with an ultrasonic homogenizer (20 kHz) at room temperature for 2 minutes to prepare an emulsion. In addition, the same operation as above was performed using dry soybean powder having the average particle size of 35 μm instead of the dry soybean powder having the average particle size of 198 μm for comparison. As a result, the emulsion prepared from the dry soybean powder having the average particle size of 198 μm did not have mayonnaise-like properties immediately after the emulsification treatment and was liquid (FIG. 9). The emulsion stability of each emulsion was examined by centrifugation at 30 G for 3 minutes at room temperature. The emulsion prepared from the dry soybean powder having the average particle size of 198 μm separated into an oil layer, an aqueous layer, and a precipitated powder (FIG. 10). These results were also supported by the measured dynamic viscoelasticity of each emulsion (FIG. 11). In the emulsion of the dry soybean powder having the average particle size of 198 μm, the loss elasticity was higher than the storage elasticity (that is, loss tangent was 1 or more), indicating that it was liquid. From the above results, it was found that when the particle size of the dry soybean powder is larger than about 200 μm, not only the dispersibility in water is lowered, but also the emulsion composition does not have mayonnaise-like properties and the emulsion stability is also lowered.

FIG. 9 is a photograph showing the comparison of the states of emulsions immediately after emulsification. FIG. 10 is a photograph showing the comparison of the state of emulsions after centrifugation at 30 G for 3 minutes at room temperature. In FIGS. 9 and 10, the left side shows an emulsion prepared from the dry soybean powder having the average particle size of 35 and the right side shows an emulsion prepared from the dry soybean powder having the average particle size of 198 FIG. 11 is a graph showing the dynamic viscoelasticity of emulsions measured in the same manner as in Example 2. In FIG. 11, the dots (●) and the solid line represent the storage elasticity (G') of the emulsion prepared from the dry soybean powder having the average particle size of 35 the diamond-shaped marks (◇) and the solid line represent the loss elasticity (G") of the emulsion prepared from the dry soybean powder having the average particle size of 35 the dots (●) and the dashed line represent the storage elasticity (G') of the emulsion prepared from the dry soybean powder having the average particle size of 198 μm, and the diamond-shaped marks (◇) and the dashed line represent the loss elasticity (G") of the emulsion prepared from the dry soybean powder having the average particle size of 198 μm. The vertical axis represents the storage elasticity (G') and the loss elasticity (G") (unit: Pa), and the horizontal axis represents the angular frequency (unit: rad/s).

Figure 12:
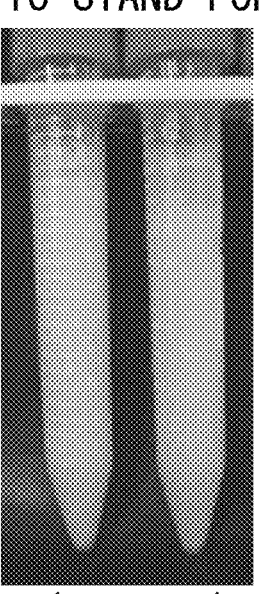
FIG. 12 is a photograph showing the emulsion stability of aqueous suspensions of the dry soybean powder having different particle sizes. In the photograph, the left side shows an aqueous suspension of the dry soybean powder having the average particle size of 35 μm, and the right side shows an aqueous suspension of the dry soybean powder having the average particle size of 129 μm (Example 3).

An emulsion was prepared from the dry soybean powder having the average particle size of 129 μm described in Preparation Example 1 (FIG. 2). Ten parts by mass of the dry soybean powder having the average particle size of 129 μm were suspended in 90 parts by mass of water and left to stand at room temperature for 90 minutes (FIG. 12). In addition, the same operation as above was performed using the dry soybean powder having the average particle size of 35 μm instead of the dry soybean powder having the average particle size of 129 μm for comparison. As a result, the aqueous suspension of the dry soybean powder having the average particle size of 129 μm was found to be slightly separated from the water. FIG. 12 is a photograph showing the emulsion stability of aqueous suspensions of the dry soybean powder having different particle sizes. In FIG. 12, the left side shows an aqueous suspension of the dry soybean powder having the average particle size of 35 and the right side shows an aqueous suspension of the dry soybean powder having the average particle size of 129 μm.

Figure 13:
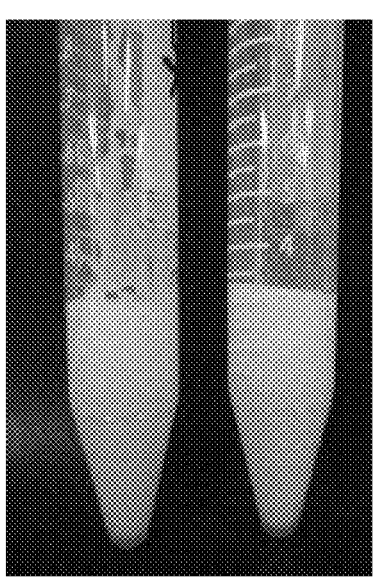
FIG. 13 is a photograph showing the comparison of emulsions in the state after centrifugation at 30 G for 3 minutes at room temperature. In the photograph, the left side shows an emulsion of the dry soybean powder having the average particle size of 35 μm, and the right side shows an emulsion of the dry soybean powder having the average particle size of 129 μm (Example 3).

Next, 7 parts by mass of the dry soybean powder having the average particle size of 129 μm, 46.5 parts by mass of water, and 46.5 parts by mass of rapeseed oil were mixed, and the obtained mixture was emulsified with an ultrasonic homogenizer for 2 minutes in the same manner as above to prepare an emulsion. In addition, the same operation as above was performed using the dry soybean powder having the average particle size of 35 μm instead of the dry soybean powder having the average particle size of 129 μm for comparison. As a result, the emulsion prepared from the dry soybean powder having the average particle size of 129 μm exhibited the mayonnaise-like properties. The emulsion stability of each emulsion was examined by centrifugation at 30 G for 3 minutes at room temperature, which resulted in a slight separation of the aqueous layer (FIG. 13). From the above results, it was found that as the particle size of the dry soybean powder increases, the dispersibility in water decreases, but a composition having mayonnaise-like properties is formed. FIG. 13 is a photograph showing the comparison of the states of emulsions after centrifugation at 30 G for 3 minutes at room temperature. In FIG. 13, the left side shows the emulsion of the dry soybean powder having the average particle size of 35 μm, and the right side shows the emulsion of the dry soybean powder having the average particle size of 129 μm.

(Example 4) Effect test of heat treatment on dry soybean powder before emulsification. To investigate the effect of heat treatment on dry soybean powder before emulsification, the following tests were conducted on kinako (product name: "Style One Kinako", manufactured by TOKAN Co, Ltd.) (comparative example) and roasted soybean powder, which was prepared by roasting dry soybean powder having the average particle size of 35 μm in a frying pan until the color thereof is changed (comparative example). Further, a similar test was conducted using the dry soybean powder having the average particle size of 35 μm (present embodiment) instead of the above-mentioned heat-treated soybean powder.

Figure 14:
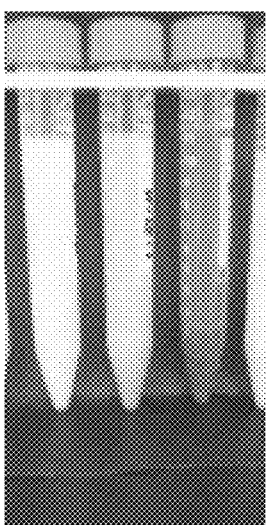
FIG. 14 is a photograph showing the emulsion stability of aqueous suspensions of the dry soybean powder after heat treatment. In the photograph, dry soybean powder having the average particle size of 35 μm, kinako (comparative example), and roasted soybean powder (comparative example) are shown in order from left to right (Example 4).
Figure 15:
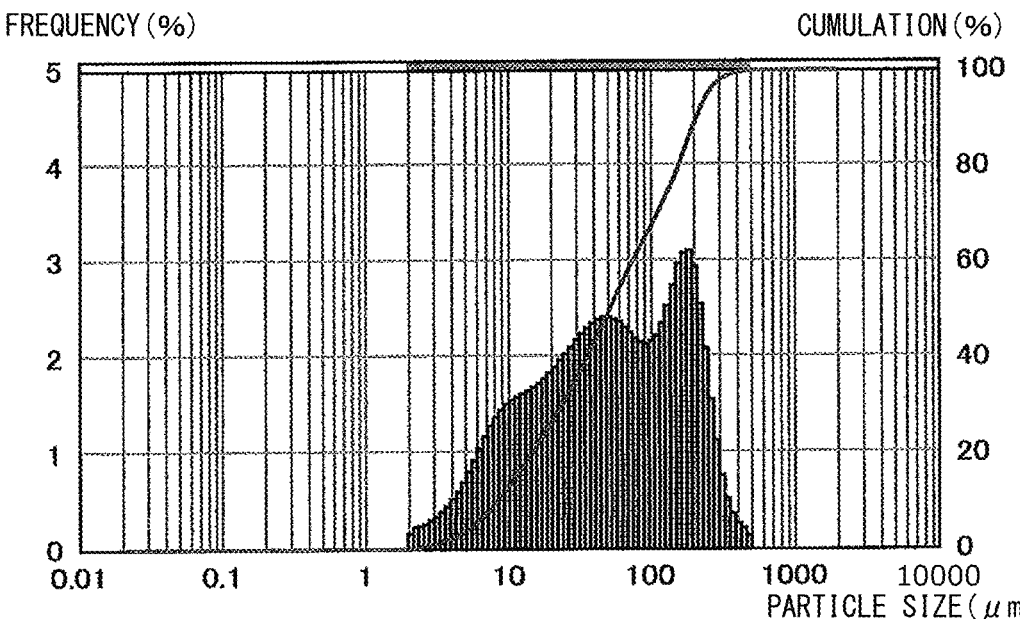
FIG. 15 shows the particle size distribution of kinako measured with the laser diffraction particle size analyzer (Example 4).
Figure 16:
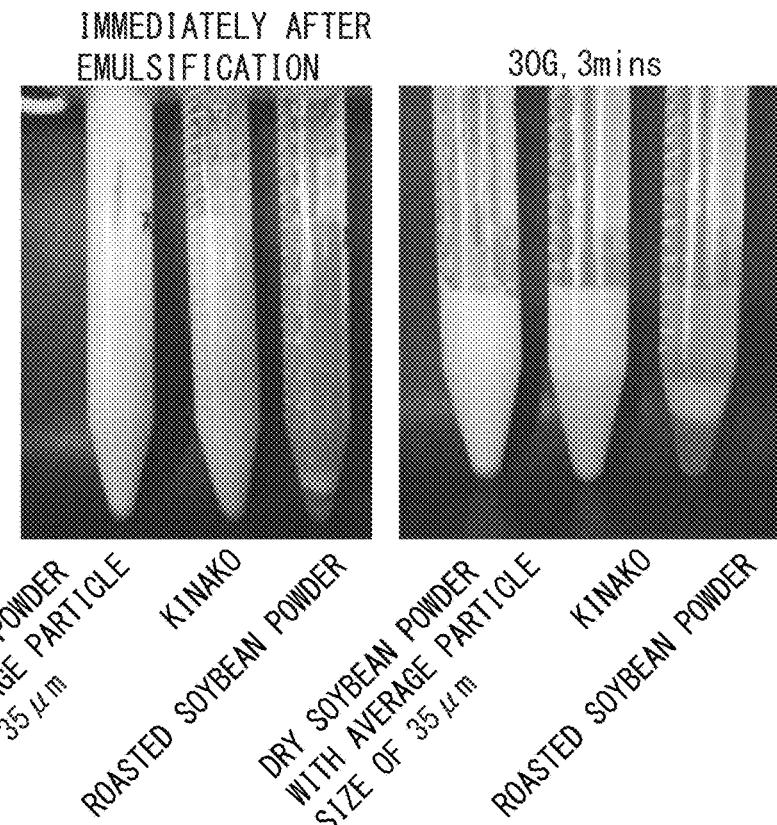
FIG. 16 shows photographs comparison of emulsions in the states immediately after emulsification (left) and after centrifugation at 30 G for 3 minutes at room temperature (right). In the photograph, dry soybean powder having the average particle size of 35 μm, kinako (comparative example), and roasted soybean powder (comparative example) are shown in order from left to right (Example 4).

Kinako or roasted soybean powder was suspended in water to 14 mass % and allowed to stand for 90 minutes, resulting in precipitation of the powder (FIG. 14). As a result of examining the particle size distribution of kinako in the same way as in Preparation Example 1, the average particle size was 84 μm (FIG. 15). As a result of subjecting the aqueous suspension of kinako or roasted soybean powder to SDS-PAGE, no band was detected at 30 to 40 kDa in either case, indicating that the aqueous suspensions of kinako and roasted soybean powder did not contain 11S protein (FIG. 4). In addition, 7 parts by mass of kinako or roasted soybean powder were suspended in 46.5 parts by mass of water, the suspension was mixed with 46.5 parts by mass of rapeseed oil, and the obtained mixture was subjected to emulsification (1 pass) with a high-pressure homogenizer at 80 MPa to prepare an emulsion, but neither of them exhibited mayonnaise-like properties (FIG. 16, left). Each emulsion was centrifuged at 30 G and room temperature for 3 minutes. As a result, the emulsions of kinako and roasted soybean powder were not only separated into an oil layer and an aqueous layer but also the powders precipitated (FIG. 16, right). From the above results, it was considered that when the dry soybean powder is heated, not only the dispersibility in water is lowered, but also the protein having an emulsifying action is insolubilized and cannot be emulsified.

FIG. 4 is an electrophoresis image showing the results of SDS-PAGE on aqueous suspensions of dry soybean powder, kinako, and roasted soybean powder having the average particle size of 35 In FIG. 4, in order from left to right, M (molecular weight marker), the dry soybean powder having the average particle size of 35 kinako, and the roasted soybean powder are shown. FIG. 14 is a photograph showing the results of examining the emulsion stability of aqueous suspensions of the dry soybean powder, kinako, and the roasted soybean powder having the average particle size of 35 μm. In FIG. 14, in order from left to right, the dry soybean powder, kinako, and the roasted soybean powder having the average particle size of 35 μm are shown. FIG. 15 shows the particle size distribution of kinako measured with a laser diffraction particle size analyzer. FIG. 16 includes photo-graphs comparing the emulsions immediately after emulsification (left) and after centrifugation at 30 G for 3 minutes at room temperature (right). In FIG. 16, from left to right, the dry soybean powder, kinako, and the roasted soybean powder having the average particle size of 35 μm are shown.

Figure 17:
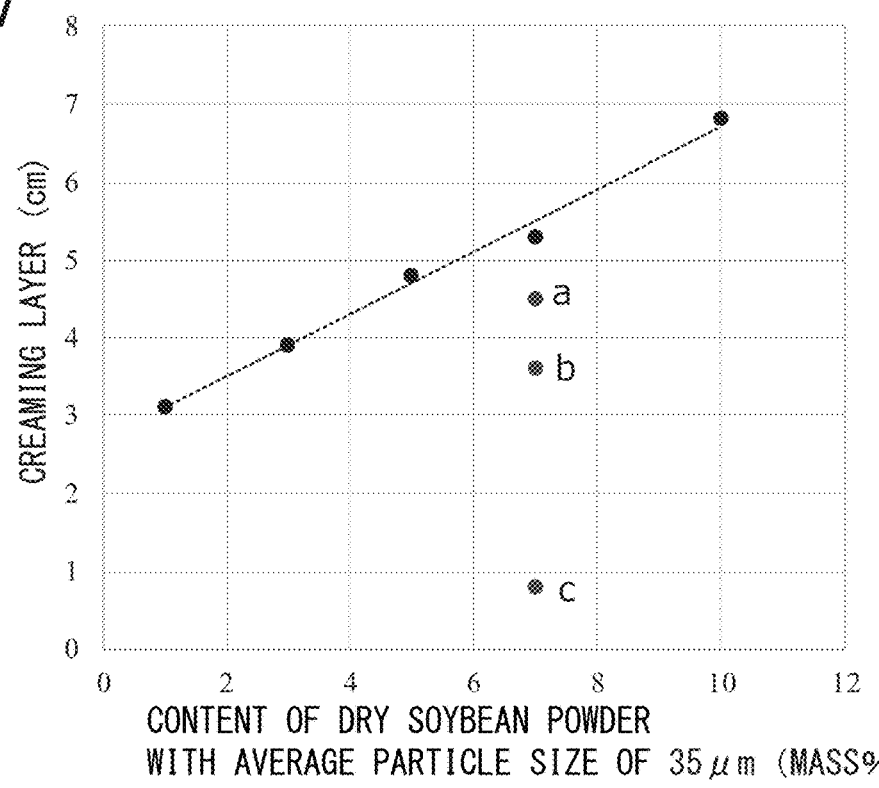
FIG. 17 is a graph showing the relationship between the content of the dry soybean powder having the average particle size of 35 μm and the thickness of the emulsified layer. In the graph, the dotted line shows the relationship between the content of the dry soybean powder having the average particle size of 35 μm (1 mass % or more and 10 mass % or less) and the thickness of the emulsified layer (creaming layer). The plots of a, b or c represent the thickness of the emulsified layer in emulsions prepared from 11S protein under different heat treatment conditions, wherein a: pre-heated 11S protein+cellulose, b: 40° C. heated 11S protein+cellulose, and c: 100° C. heated 11S protein+cellulose. The vertical axis represents the thickness of the creaming layer (cm), and the horizontal axis represents the content (mass %) of the dry soybean powder having the average particle size of 35 μm (Example 5).

(Example 5) Relationship between emulsified layer and heating. An emulsion having the composition shown in Table 1 was prepared by the method described in Example 1. Ten grams (10 g) of each emulsion was taken and transferred to a centrifuge tube having an inner diameter of 1.3 cm and a length of 10.5 cm, and subjected to ultracentrifugation at 75,000 G for 5 minutes at room temperature to load the emulsified layer, and the thickness of the emulsified layer was measured. FIG. 17 and Table 1 show the relationship between the content of the dry soybean powder having the average particle size of 35 μm in the emulsion and the thickness of the emulsified layer. The thickness of the emulsified layer (creaming layer) correlates well with the amount of emulsifier, so it is considered a reasonable indicator of emulsifying power.

TABLE 1

| DRY SOYBEAN POWDER WITH AVERAGE PARTICLE SIZE OF 35 μm (MASS %) | RAPESEED OIL (MASS %) | WATER (MASS %) | CREAMING LAYER (cm) |
|---|---|---|---|
| 10 | 45 | 45 | 6.8 |
| 7 | 46.50 | 46.50 | 5.3 |
| 5 | 47.50 | 47.50 | 4.8 |
| 3 | 48.50 | 48.50 | 3.9 |
| 1 | 49.50 | 49.50 | 3.1 |

Figure 18:
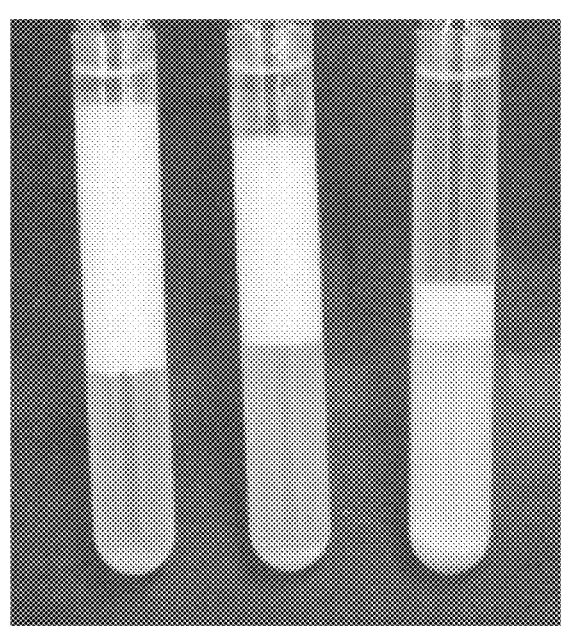
FIG. 18 is a photograph showing the comparison of the thickness of the emulsified layers of emulsions prepared from 11S protein under different heat treatment conditions. In the photograph, from left to right, a: pre-heated 11S protein+cellulose, b: 40° C. heated 11S protein+cellulose, and c: 100° C. heated 11S protein+cellulose, respectively (Example 5).

Next, an emulsion was prepared from the fractionated 11S protein and cellulose in the same manner as in Example 1. First, 1 part by mass (dry mass ratio) of 11S protein was suspended in 48.925 parts by mass of water to prepare an aqueous suspension of 11S protein. The aqueous suspension was heated at temperatures of 40° C. and 100° C. for 1 hour. Next, using the aqueous suspension, a mixture having the composition shown in Table 2 was prepared, and the obtained mixture was emulsified with an ultrasonic homogenizer (20 kHz) at room temperature for 2 minutes to prepare an emulsion. 11S protein and cellulose were added at a mass equivalent of 7 mass % of dry soybean powder having the average particle size of 35 For comparison, an emulsion was prepared in the same manner as above using the above-mentioned aqueous suspension of 11S protein before heat treatment. Ten grams (10 g) of each emulsion were taken and subjected to ultracentrifugation in the same manner as above, and the thickness of the emulsified layer was measured. The emulsion prepared from 11S protein as the emulsifier before heat treatment maintained an emulsified layer (creaming layer) of 4.5 cm, while the emulsion prepared from 11S protein heated at 40° C. maintained an emulsified layer of only 3.6 cm, and the emulsion prepared from 11S protein heated at 100° C. maintained an emulsified layer of only 0.8 cm (FIGS. 17 and 18, Table 2). These results suggest that when 11S protein is heated at about 40° C., it still has some emulsifying power, but when heated above 40° C., 11S protein denatures and loses its emulsifying power as the heating conditions become stronger.

TABLE 2

| | EMULSIFIER | 11S PROTEIN (DRY MASS RATIO. %) | CELLULOSE (DRY MASS RATIO. %) | RAPESEED OIL (MASS %) | WATER (MASS %) | CREAMING LAYER (cm) |
|---|---|---|---|---|---|---|
| a | PRE-HEATED 11S PROTEIN | 1.0 | 0.075 | 50 | 48.925 | 4.5 |
| b | 40° C. HEATED 11S PROTEIN | 1.0 | 0.075 | 50 | 48.925 | 3.6 |
| c | 100° C. HEATED 11S PROTEIN | 1.0 | 0.075 | 50 | 48.925 | 0.8 |

FIG. 17 is a graph showing the relationship between the content of the dry soybean powder having the average particle size of 35 μm and the thickness of the emulsified layer. In FIG. 17, the dotted line shows the relationship between the content of the dry soybean powder having the average particle size of 35 μm (range between 1 mass % or more and 10 mass % or less) and the thickness of the emulsified layer (creaming layer). The plots of a, b and c represent the thickness of the emulsified layer in emulsions prepared from 11S protein under different heat treatment conditions, wherein a: pre-heated 11S protein+cellulose, b: 40° C. heated 11S protein+cellulose, and c: 100° C. heated 11S protein+cellulose. The vertical axis represents the thickness of the creaming layer (cm), and the horizontal axis represents the content (mass %) of the dry soybean powder having the average particle size of 35 FIG. 18 is a photograph showing the comparison of the thickness of the emulsified layers of the emulsions prepared from 11S protein under different heat treatment conditions. FIG. 18 shows a: pre-heated 11S protein+cellulose, b: 40° C.-heated 11S protein+cellulose, and c: 100° C.-heated 11S protein+cellulose in order from left to right.

Figure 19:
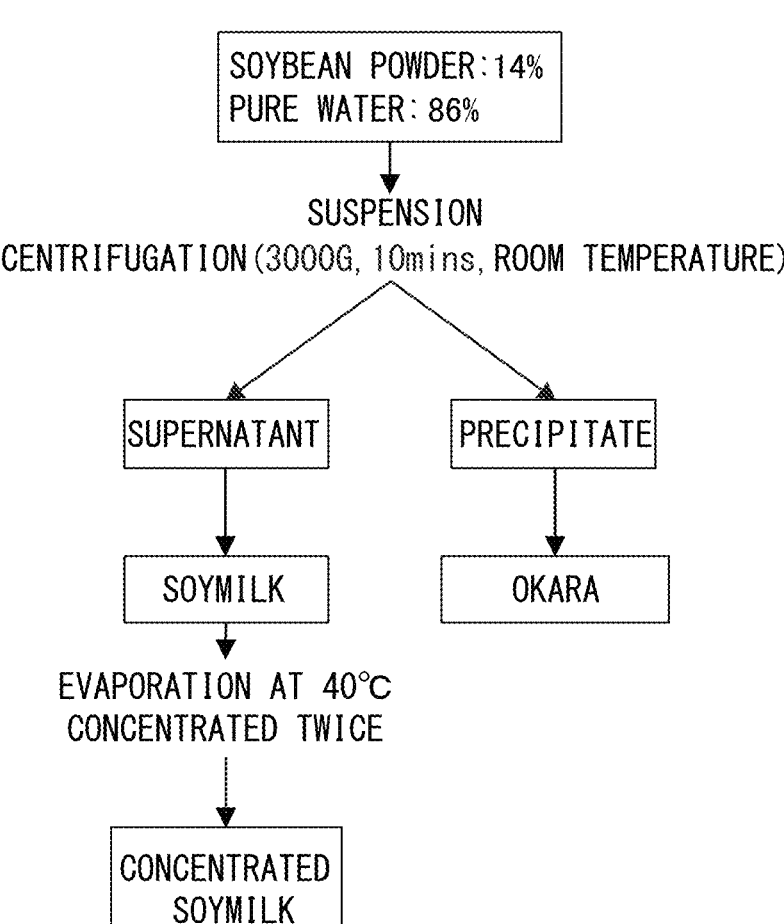
FIG. 19 shows a method for preparing soymilk and okara (soybean curd residue) from dry soybean powder (Example 6).

(Example 6) Examination of ingredient balance. The emulsion composition of the present embodiment can also be prepared by using an aqueous suspension of the dry soybean powder having the average particle size of 35 μm separated into soymilk and okara by centrifugation. As shown in FIG. 19, when an aqueous suspension containing 14 mass % of the dry soybean powder having the average particle size of 35 μm is centrifuged (3000 G, 10 minutes, room temperature), it separates into a supernatant and a precipitate. The weight thereof was measured, and it was found that 75% of the supernatant and 25% of the precipitate (by mass) were obtained from the aqueous suspension containing 14 mass % of the dry soybean powder having the average particle size of 35 μm. This supernatant was collected as soymilk and the precipitate was collected as okara. Using the soymilk and okara collected in this way, emulsions having the compositions shown in Table 3 were prepared.

TABLE 3

| | EMULSIFIER INCLUDING 11S PROTEIN | SOYMILK (MASS %) | OKARA (DRY MASS RATIO, %) | WATER (MASS %) | RAPESEED OIL (MASS %) |
|---|---|---|---|---|---|
| A | SOYMILK | 37.5 | 1.875 | 10.625 | 50 |
| B | CONCEN-TRATED SOYMILK | 37.5 | 1.875 | 10.625 | 50 |
| C | SOYM I LK | 25 | 3.75 | 21.25 | 50 |
| D | CONCEN-TRATED SOYMILK | 25 | 3.75 | 21.25 | 50 |

First, when 37.5 parts by mass of soymilk and 1.875 parts by mass of dried okara were suspended in 10.625 parts by mass of water, the composition of the ingredients was the same as the original aqueous suspension containing 14 mass % of the dry soybean powder having the average particle size of 35 μm. The aqueous suspension was then mixed with an equal amount of rapeseed oil, and the resulting mixture was emulsified as in Example 1 to prepare an emulsion with the composition of "A" in Table 3. This emulsion was a composition having mayonnaise-like properties similar to Example 1, and the measured values of dynamic viscoelasticity were not different from those of Example 2.

Figure 20:
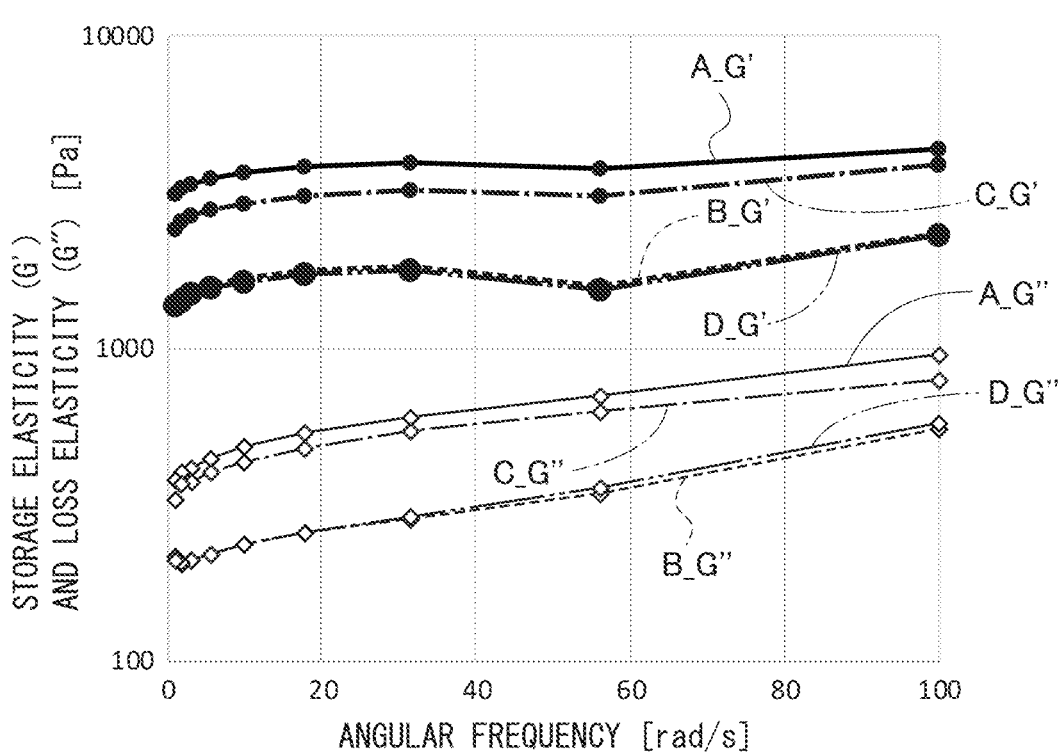
FIG. 20 is a graph of dynamic viscoelasticity of emulsions. In the graph, A_G' (dots (●) and thick solid line) represents the storage elasticity of "A" in Table 3, B_G' (dots (●) and thick dashed line) represents the storage elasticity of "B" in Table 3, C_G' (dots (●) and thick single-dotted line) represents the storage elasticity of "C" in Table 3, D_G' (dots (●) and thick double-dotted line) represents the storage elasticity of "D" in Table 3, A_G" (diamond-shaped marks (◇) and thin solid line) represents the loss elasticity of "A" in Table 3, B_G" (diamond-shaped marks (◇) and thin dashed line) represents the loss elasticity of "B" in Table 3, C_G" (diamond-shaped marks (◇) and thin single-dotted line) represents the loss elasticity of "C" in Table 3, and D_G" (diamond-shaped marks (◇) and thin double-dotted line) represents the loss elasticity of "D" in Table 3. The vertical axis is the storage elasticity (G') and loss elasticity (G") (unit: Pa), and the horizontal axis is the angular frequency (rad/s) (Example 6).

Soymilk may be concentrated twice with an evaporator to contain twice the protein component containing 11S protein. This is referred to as "concentrated soymilk". Then, 37.5 parts by mass of concentrated soymilk and 1.875 parts by mass of dried okara were suspended in 10.625 parts by mass of water, and emulsified with an equal amount of rapeseed oil in the same manner as above to prepare an emulsion having the composition of "B" in Table 3. This emulsion had about twice the storage elasticity and loss elasticity values, that is, it was a solid emulsion, compared to the emulsion of the dry soybean powder having the average particle size of 35 μm prepared in Example 1 (FIG. 20).

Figure 21:
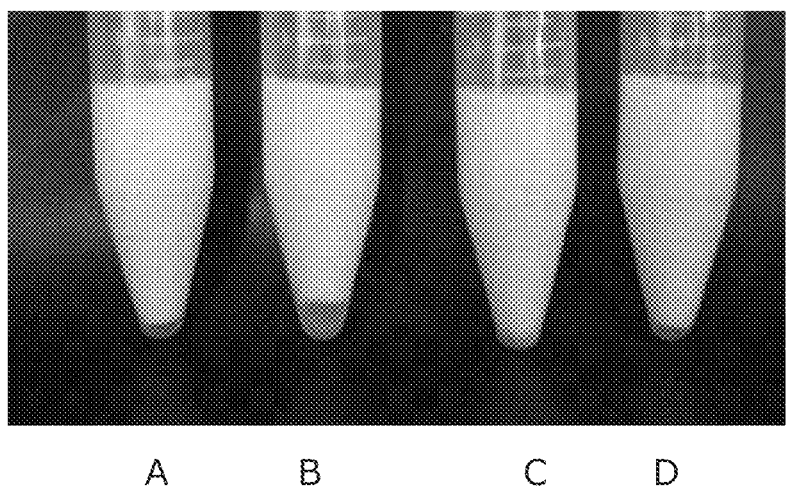
FIG. 21 is a photograph of the emulsions after centrifugation at 1200 G for 5 minutes at room temperature. In the photograph, in order from left to right, the emulsions of "A", "B", "C", and "D" in Table 3 are shown (Example 6).

On the other hand, the emulsion of "C" in Table 3, which was prepared by suspending 25 parts by mass of soymilk and 3.75 parts by mass of dried okara in 21.25 parts by mass of water and emulsifying them in the same manner as above, did not differ in the values of storage elasticity and loss elasticity from the emulsion of the dry soybean powder having the average particle size of 35 μm in Example 1 (it had the same level of mayonnaise-like properties as the emulsion "A" in Table 3). However, as a result of examining the emulsion stability of each emulsion by centrifuging it at 1,200 G for 5 minutes at room temperature, the emulsion stability of the emulsion of "C" was improved (separation of aqueous layer was suppressed) compared to the emulsion of "A" in Table 3 (FIG. 21). The emulsion of "D", in which the soymilk in "C" in Table 3 was replaced by concentrated soymilk, exhibited the same hard physical properties as the emulsion of "B", but the separation of the aqueous layer was small and the emulsion stability was improved compared to the emulsion of "B".

These results suggest that the concentration of protein containing 11S protein (contained in soymilk) controls the hardness (viscoelasticity) of the emulsion composition, and the concentration of fiber containing cellulose (contained in okara) controls the stability of the emulsion composition. Therefore, it was suggested that the physical properties of the emulsion composition can be controlled by adjusting the concentrations of 11S protein and cellulose according to the physical properties of the target emulsion composition.

FIG. 19 shows the method for preparing soymilk and okara from the dry soybean powder having the average particle size of 35 μm. FIG. 20 is a graph showing the dynamic viscoelasticity of emulsions. In FIG. 20, A_G' (dots (●) and thick solid line) represents the storage elasticity of "A" in Table 3, B_G' (dots (●) and thick dashed line) represents the storage elasticity of "B" in Table 3, C_G' (dots (●) and thick single-dotted line) represents the storage elasticity of "C" in Table 3, D_G' (dots (●) and thick double-dotted line) represents the storage elasticity of "D" in Table 3, A_G" (diamond-shaped marks (◇) and thin solid line) represents the loss elasticity of "A" in Table 3, B_G" (diamond-shaped marks (0) and thin dashed line) represents the loss elasticity of "B" in Table 3, C_G" (diamond-shaped marks (◇) and thin single-dotted line) represents the loss elasticity of "C" in Table 3, and D_G" (diamond-shaped marks (◇) and thin double-dotted line) represents the loss elasticity of "D" in Table 3. The vertical axis is the storage elasticity (G') and loss elasticity (G") (unit: Pa), and the horizontal axis is the angular frequency (rad/s). FIG. 21 is a photograph showing the emulsions after centrifugation at 1200 G for 5 minutes at room temperature. In FIG. 21, the emulsions of "A", "B", "C", and "D" in Table 3 are shown in order from left to right.

Figure 22:
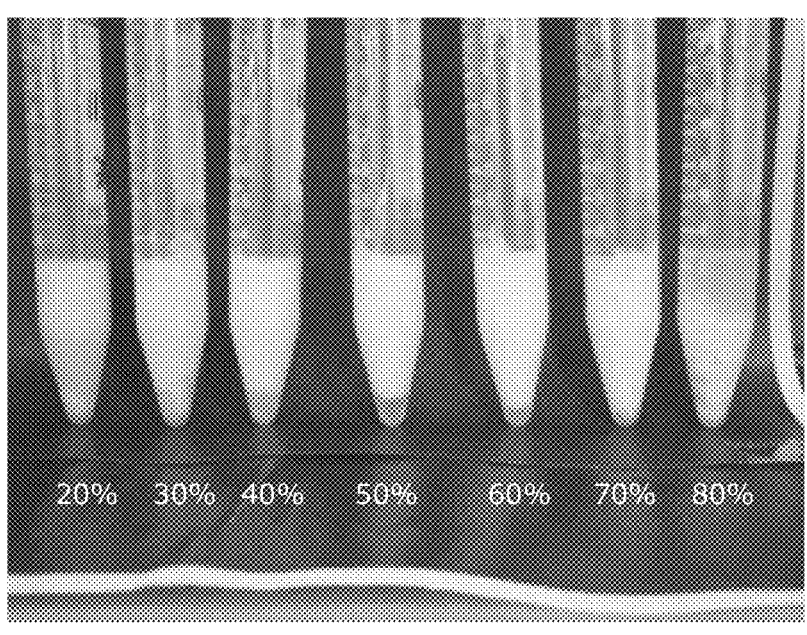
FIG. 22 is a photograph of emulsions having different blending amounts of fat and oil after centrifugation at 30 G for 3 minutes at room temperature. In the photograph, in order from left to right, emulsions containing rapeseed oil at 20%, 30%, 40%, 50%, 60%, 70%, and 80% (mass ratio) are shown (Example 6).

Furthermore, the effects of changing the blending amounts of water and rapeseed oil on the physical properties of the emulsions were studied using the emulsions prepared by mixing dry soybean powder having the average particle size of 35 μm, water, and rapeseed oil, and emulsifying the mixture with an ultrasonic homogenizer (20 kHz) for 2 minutes at room temperature. When the emulsions with rapeseed oil concentrations in a range between 20 mass % or more and 80 mass % or less (blending amount of dry soybean powder having the average particle size of 35 μm was fixed at 7 mass %) were centrifuged at 30 G for 3 minutes at room temperature, emulsions containing rapeseed oil in a range between 30 mass % or more and 70 mass % or less showed stable mayonnaise-like properties (FIG. 22). On the other hand, when the amount of rapeseed oil was 20 mass % or less, the emulsion did not have mayonnaise-like properties, and when the amount of rapeseed oil was too high (80 mass % or more), emulsification was not possible. These results indicate that it is possible to make low-calorie products with controlled calories by controlling the amount of the fat and oil. In addition, these products have zero cholesterol because they do not include animal ingredients. FIG. 22 is a photograph showing emulsions having different blending amounts of fat and oil after centrifugation at 30 G for 3 minutes at room temperature. In FIG. 22, from left to right, emulsions containing rapeseed oil at 20%, 30%, 40%, 50%, 60%, 70%, and 80% (mass ratio) are shown.

Figure 23A:
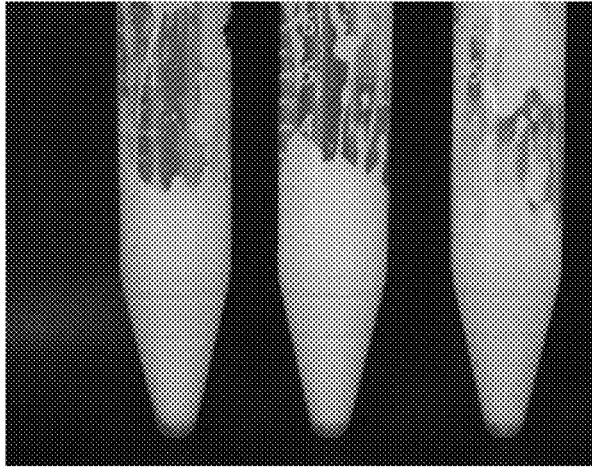
FIG. 23A is a photograph of the emulsions after centrifugation at 30 G for 3 minutes at room temperature. In the photograph, in order from left to right, the emulsions emulsified with a high-pressure homogenizer at 20 MPa, 40 MPa, and 80 MPa are shown (Example 7).
Figure 23B:
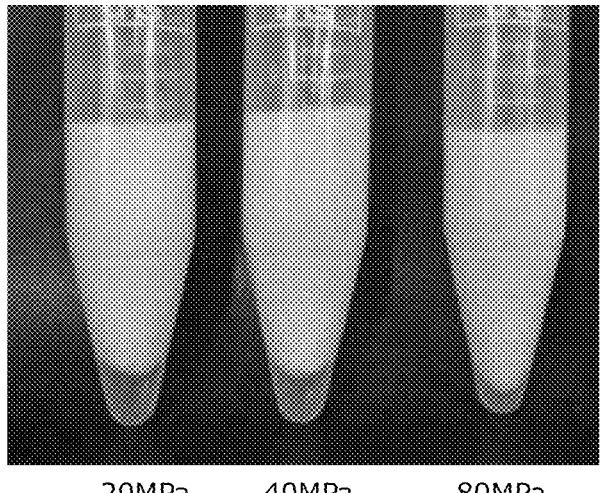
FIG. 23B is a photograph showing the emulsions after centrifugation at 1200 G for 5 minutes at room temperature. In the photograph, in order from left to right, the emulsions emulsified with a high-pressure homogenizer at 20 MPa, 40 MPa, and 80 MPa are shown (Example 7).

(Example 7) Examination of conditions for high-pressure homogenizer. Seven parts by mass of the dry soybean powder having the average particle size of 35 μm were suspended in 46.5 parts by mass of water, the suspension was mixed with 46.5 parts by mass of rapeseed oil, and the obtained mixture was emulsified with a high-pressure homogenizer at 20 MPa or higher and 80 MPa or lower to prepare an emulsion. All the obtained emulsions exhibited mayonnaise-like properties. To examine the stability of the emulsions, each emulsion was centrifuged at 30 G at room temperature for 3 minutes, and all emulsions did not separate the aqueous and oil layers (FIG. 23A). As a result of further increasing the centrifugal force and centrifuging at 1200 G for 5 minutes at room temperature, the aqueous layer separated slightly in the emulsions emulsified at 20 MPa or 40 MPa, while the aqueous layer did not separate in the emulsion emulsified at 80 MPa (FIG. 23B). Therefore, the emulsification at 80 MPa or higher resulted in an extremely stable emulsion, but the emulsification at 20 MPa or higher also resulted in mayonnaise-like properties. In the present example, the emulsification treatment was carried out at 100 MPa or lower to protect the high-pressure homogenizer.

The dynamic viscoelasticity of each emulsion was measured, and the values of storage elasticity and loss elasticity were lowest for the emulsion treated at 20 MPa, and almost the same for the emulsions treated at 40 and 80 MPa (data not shown). However, there was more separation of the aqueous layer in the emulsions treated at 20 MPa and 40 MPa than in the emulsions treated at 80 MPa. These results indicate that processing at a pressure of 40 MPa or higher can produce compositions having general mayonnaise-like properties.

FIG. 23A is a photograph showing the emulsions after centrifugation at 30 G for 3 minutes at room temperature. FIG. 23B is a photograph showing the emulsions after centrifugation at 1,200 G for 5 minutes at room temperature. In FIGS. 23A and 23B, in order from left to right, the emulsions emulsified with a high-pressure homogenizer at 20 MPa, 40 MPa, and 80 MPa are shown.

Figure 24:
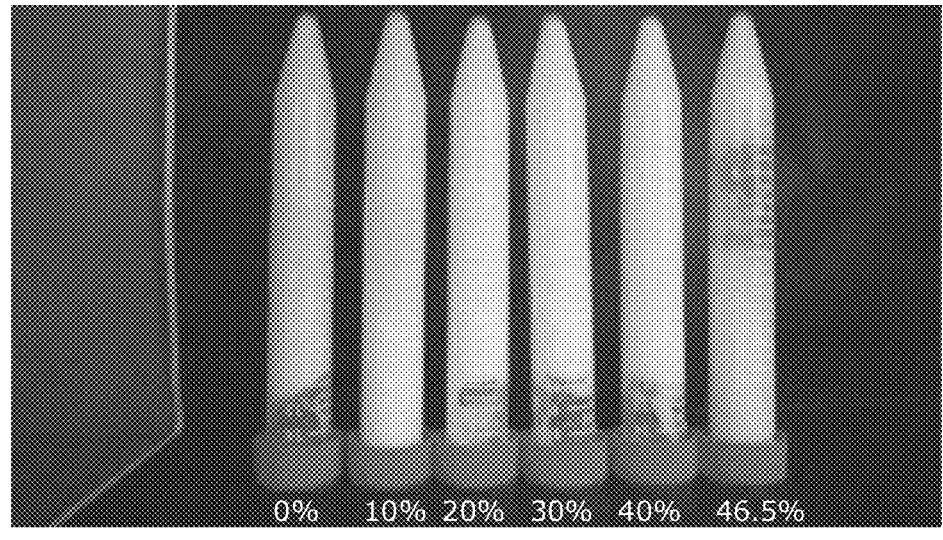
FIG. 24 is a photograph showing the comparison of emulsions having controlled acetic acid concentrations immediately after emulsification. In the photograph, in order from left to right, acetic acid concentrations of 0%, 10%, 20%, 30%, 40%, and 46.5% (mass ratio) are shown (Example 8).
Figure 25:
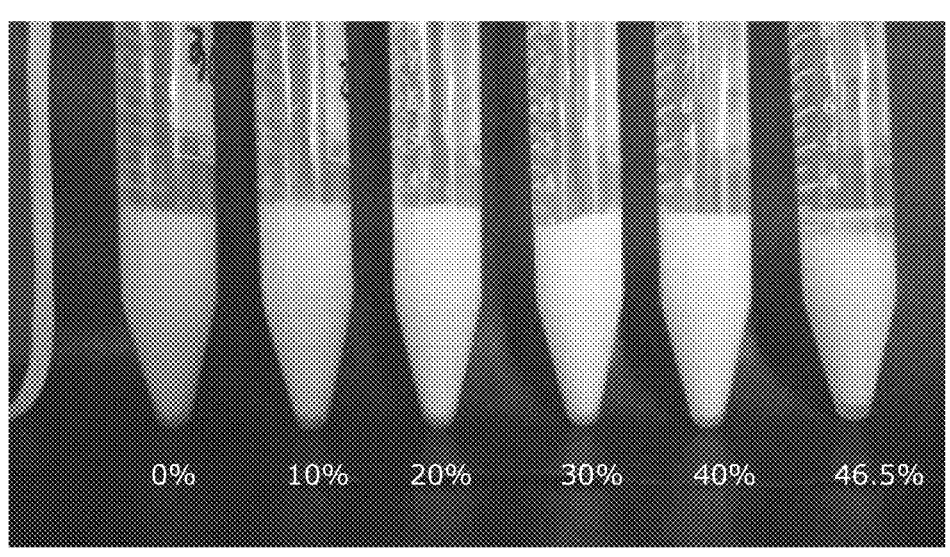
FIG. 25 is a photograph showing the comparison of the emulsions with a controlled acetic acid concentration after centrifugation at 30 G for 5 minutes at room temperature. In the photograph, in order from left to right, acetic acid concentrations of 0%, 10%, 20%, 30%, 40%, and 46.5% (mass ratio) are shown (Example 8).

(Example 8) Examination of acetic acid concentration. The mayonnaise-like properties of the emulsion composition of the present embodiment are enhanced by adding acetic acid. Acetic acid was added at an arbitrary concentration to water in which dry soybean powder having the average particle size of 35 μm was suspended, and the suspension was emulsified with an ultrasonic homogenizer (20 kHz) for 2 minutes at room temperature, thereby preparing emulsions containing 7 mass % of the dry soybean powder having the average particle size of 35 μm and 46.5 mass % of rapeseed oil, and having a final acetic acid concentration in a range between 0 mass % or more and 46.5 mass % or less. As a result, the emulsion having a final acetic acid concentration of 46.5 mass % resulted in protein aggregation and could not be emulsified, whereas the emulsion having a final acetic acid concentration of less than 46.5 mass % exhibited mayonnaise-like properties (FIG. 24). Next, to examine the stability of the emulsions, each emulsion was centrifuged at 30 G for 5 minutes at room temperature. As a result, in the emulsion having the final acetic acid concentration of 46.5 mass %, the aqueous layer and oil layer separated and the emulsion could not be maintained, whereas in the emulsion having the acetic acid concentration of less than 46.5 mass %, the aqueous layer and oil layer did not separate and the emulsion was found to be stable (FIG. 25). These results indicate that when acetic acid is added, the blending amount should be less than 46.5 mass %.

FIG. 24 is a photograph showing the comparison of the states of emulsions having controlled acetic acid concentration immediately after emulsification. FIG. 25 is a photograph showing the comparison of the states of emulsions having a controlled acetic acid concentration after centrifugation at 30 G for 5 minutes at room temperature. In FIGS. 24 and 25, in order from left to right, acetic acid concentrations of 0%, 10%, 20%, 30%, 40%, and 46.5% (mass ratio) are shown.

(Example 9) Emulsion compositions prepared from various legume seeds. In legume seeds and other dicotyledonous plant seeds, 11S protein is found. Emulsion compositions were prepared from peanuts (seeds), red beans, kidney beans, lentils, peas, chickpeas, mung beans, and green soybeans (legumes) as seeds of edible plants classified as legumes or seeds.

Figure 26:
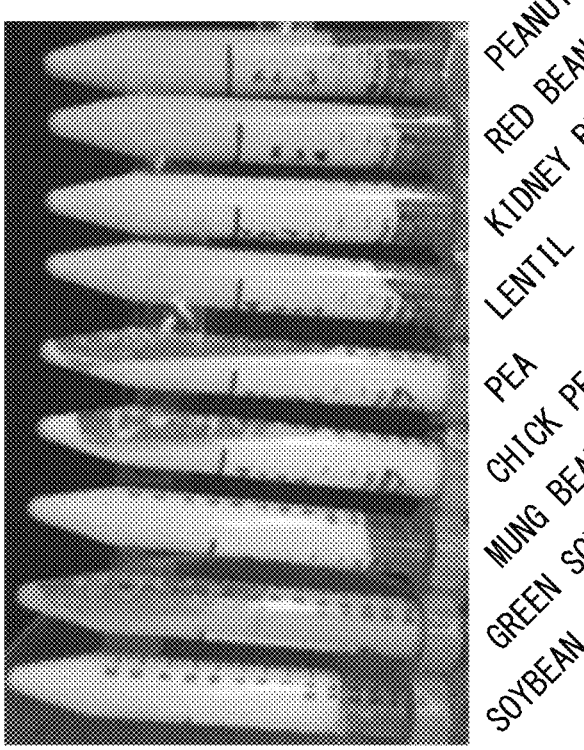
FIG. 26 is a photograph showing the comparison of emulsions prepared from various legume seed powders. In the photograph, from top to bottom, the emulsions of peanuts, red beans, kidney beans, lentils, peas (*Pisum sativum*), chickpeas (*Cicer arietinum*), mung beans, green soybeans (edamame), soybeans, are shown (Example 9).
Figure 27:
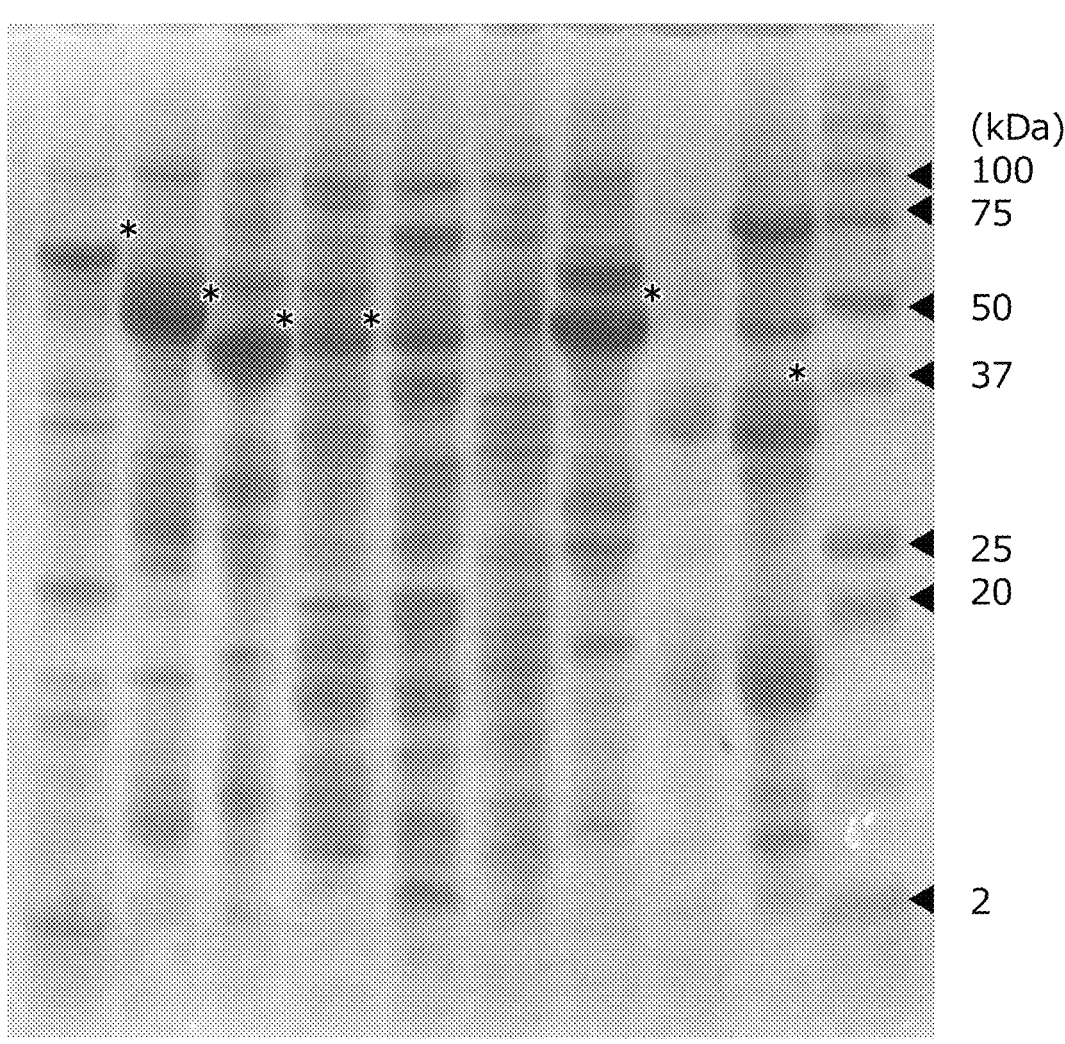
FIG. 27 is an electrophoretic image of SDS-PAGE for aqueous suspensions of various legume seed powders. In the image, in order from left to right, peanuts, red beans, kidney beans, lentils, peas, chickpeas, mung beans, green soybeans (edamame), soybeans, and molecular weight markers are shown (Example 9).

Various legume seeds were ground at 10° C. or higher and 35° C. or lower using a bead mill (RMB Easy Nano, manufactured by AIMEX Co., Ltd.), and particles having a diameter of less than 100 μm were selected using a sieve and used as legume seed powder (average particle size of each material was 41 μm for peanuts, 75 μm for red beans, 26 μm for kidney beans, 34 μm for lentils, 93 μm for peas, 85 μm for chickpeas, 12 μm for mung beans, 52 μm for green soybeans, and 55 μm for soybeans). Seven parts by mass of each legume seed powder were suspended in 46.5 parts by mass of water, the suspension was mixed with 46.5 parts by mass of rapeseed oil, and the obtained mixture was emulsified with an ultrasonic homogenizer (20 kHz) for 2 minutes at room temperature to prepare an emulsion. For comparison, an emulsion was prepared in the same manner as above using the dry soybean powder having the average particle size of 35 μm instead of the legume seed powder. Immediately after the emulsification treatment, the physical properties of the emulsions of peanuts, red beans, kidney beans, lentils, and mung beans were of very favorable quality, with the emulsifying power of the subject of this disclosure being expressed and the composition after emulsification having mayonnaise-like properties. On the other hand, although the emulsion of peas and chickpeas was a desirable quality in which the emulsifying power, which is the subject of this disclosure, was expressed, the composition after emulsification did not have mayonnaise-like properties and had no viscous quality. For green soybeans or edamame, the quality was undesirable because it did not exhibit the emulsifying power, which is the subject of this disclosure, and did not have mayonnaise-like properties (FIG. 26, Table 4). Table 4 shows the results of the evaluation of the mayonnaise-like properties of the emulsions and the presence or absence of emulsifying power for the various legume seeds mentioned above.

powders. In FIG. 26, in order from top to bottom, the emulsions of peanuts, red beans, kidney beans, lentils, peas, chickpeas, mung beans, green soybeans, and soybeans are shown. FIG. 27 is an electrophoretic image of SDS-PAGE for aqueous suspensions of various legume seed powders. In FIG. 27, in order from left to right, peanuts, red beans, kidney beans, lentils, peas, chickpeas, mung beans, green soybeans, soybeans, and molecular weight markers are shown.

(Example 10) The ingredients (25 mass % of cut onion (5 mm square), 10 mass % of mushroom (10 mm square), 10 mass % of shimeji mushroom (10 mm square), 10 mass % of eryngii mushroom (10 mm square)) were mixed with the portion to be emulsified (25 mass % of water, 10 mass % of olive oil, 2 mass % of almond powder (average particle size 50 μm), 2 mass % of cashew nut powder (average particle size 50 μm), and 6 mass % of salt), and the mixture was stirred well and emulsified with an ultrasonic homogenizer (20 kHz) for 2 minutes at room temperature to prepare an emulsion composition including ingredients.

For the obtained emulsion composition including ingredients, the passed fraction after passing 100 g of the sample through 9 mesh (Tyler mesh) was used as the emulsion composition, and ingredients and others having a particle size distribution of 2,000 μm or larger, which do not contribute to the emulsification of the composition and are not subject to measurement, were excluded. The residue on the mesh after passing through the 9 mesh was allowed to stand for a sufficient period of time, and the fraction smaller than the aperture of the 9 mesh were sufficiently passed through the mesh using a spatula in such a manner that does not change the particle size of the composition, thereby obtaining the passed fraction.

TABLE 4

| | PEANUT | RED BEAN | KIDNEY BEAN | LENTIL | PEA | CHICK PEA | MUNG BEAN | GREEN SOYBEAN | SOYBEAN |
|---|---|---|---|---|---|---|---|---|---|
| MAYONNAISE-LIKE PROPERTY | ◎ | ○ | ○ | Δ | × | × | ◎ | × | ◎ |
| EMULSIFYING POWER | ○ | ○ | ○ | ○ | ○ | ○ | ○ | × | ○ |

Evaluation of mayonnaise-like properties: a double circle (◎) denotes that it does not fall off even when upside down; a circle (○) denotes that it does not flow when tilted; a triangle (Δ) denotes that it flows when tilted; and a cross (×) denotes that it has no viscosity or does not emulsify. Evaluation of emulsifying power: a circle (○) donates emulsifying power is present and a cross (×) denotes that emulsifying power is absent.

Next, aqueous suspensions of various legume seed powders were subjected to SDS-PAGE, and a darker band (indicated by * in FIG. 27) was detected around 37 to 75 kDa for peanuts, red beans, kidney beans, lentils, mung beans, and soybeans compared to other bands. This dark band was thought to be the major storage protein in each seed, corresponding to 11S protein in soybean. On the other hand, there were no prominent dark bands for peas and chickpeas, suggesting a low level of accumulation of proteins corresponding to 11S protein. Furthermore, few bands were detected for green soybeans (FIG. 27). It was thought that immature seeds such as green soybeans do not develop emulsification and mayonnaise-like properties due to the lack of concentration of seed storage proteins including 11S protein.

FIG. 26 is a photograph showing the comparison of the state of emulsions prepared from various legume seed As a result, 45 g of the passed fraction (emulsion composition) was obtained from 100 g of the emulsion composition including ingredients. The blending amount of each ingredient in the emulsion composition calculated excluding the ingredients is as follows: 55.6 parts by mass of water, 22.2 parts by mass of olive oil (fat and oil), 4.4 parts by mass of almond powder (seed), 4.4 parts by mass of cashew nut powder (seed), and 13.4 parts by mass of salt.

To examine the stability of the emulsion composition, each emulsion was centrifuged at 30 G for 5 minutes at room temperature. As a result, the emulsion had no separation of the aqueous and oil layers, and was found to be a stable emulsion (corresponding to "circle (○): emulsifying power is present" in Table 4) with mayonnaise-like properties (corresponding to "circle (○): it does not flow when tilted" in Table 4).

Further, the emulsion compositions in Examples 9 and 10 were measured for the storage elasticity and the loss tangent at an angular frequency of 10 rad/s under the same conditions as in Example 2. In addition, the emulsion stability after the heat treatment was evaluated by evaluating the emulsified state after heating the emulsion compositions at 80° C. for 30 minutes. "Emulsion stability after heating" was evaluated based on the emulsifying power: a circle (○) denotes the power is present and a cross (×) denotes that the power is absent.

TABLE 5

| DICOTYLE- DONOUS PLANT SEED | EXAMPLE 9 | | | | | | | | | EXAMPLE 10 |
|---|---|---|---|---|---|---|---|---|---|---|
| | PEANUT | RED BEAN | KIDNEY BEAN | LENTIL | PEA | CHICK PEA | MUNG BEAN | GREEN SOYBEAN | SOY BEAN | ALMOND, CASHEW NUT |
| STORAGE ELASTICITY (Pa) AT 10 rad/s FREQUENCY | 967 | 5387 | 832 | 1181 | 1896 | 1160 | 1891 | 0.8 | 336 | 39 |
| LOSS TANGENT AT ANGULAR 10 rad/s FREQUENCY | 0.19 | 0.20 | 0.20 | 0.20 | 0.20 | 0.19 | 0.14 | 3.93 | 0.21 | 0.26 |
| EMULSION STABILITY AFTER HEARING | ○ | ○ | ○ | ○ | ○ | ○ | ○ | × | ○ | ○ |

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A method for producing an emulsion composition, comprising:
high-pressure homogenization processing or ultrasonic homogenization processing of a mixture comprising dry powder of dicotyledonous plant seeds having an average particle size in a range of 0.2 μm or larger and 150 μm or smaller, water, and fat and oil; and
maintaining a temperature of the mixture during the high-pressure homogenization processing or ultrasonic homogenization processing at 40° C. or lower,
wherein:
the high-pressure homogenization processing is conducted at a pressure of 1 MPa or higher, and
with respect to a total amount of the mixture, a blending amount of the dry powder of the dicotyledonous plant seeds is in a range of 1 mass % or more and 20 mass % or less, a blending amount of the water is in a range of 20 mass % or more and 69 mass % or less, and a blending amount of the fat and oil is in a range of 21 mass % or more and 70 mass % or less.

2. The method according to claim 1,
wherein the mixture further comprises acetic acid,
wherein with respect to the total amount of the mixture, a blending amount of the acetic acid is in a range between 0 mass % and 50 mass %.

3. The method according to claim 1, further comprising:
sterilization processing at a temperature in a range of 65° C. or higher and 121° C. or lower for a period in a range of 4 minutes or more and 40 minutes or less, the sterilization processing being performed after the high-pressure homogenization processing or ultrasonic homogenization processing.

4. The method according to claim 1, wherein the high-pressure homogenization processing or ultrasonic homogenization processing is performed until storage elasticity at an angular frequency of 10 rad/s becomes 10 Pa or more.

5. The method according to claim 4, wherein the high-pressure homogenization processing or ultrasonic homogenization processing is performed until loss tangent at the angular frequency of 10 rad/s becomes 3.5 or less.

6. The method according to claim 1, wherein the average particle size of the dry powder of the dicotyledonous plant seeds is in a range of 5 μm or larger and 90 μm or smaller.

7. A method for producing an emulsion composition, comprising:
high-pressure homogenization processing or ultrasonic homogenization processing of a mixture comprising:
dry powder of dicotyledonous plant seeds having an average particle size in a range of 5 μm or larger and 90 μm or smaller, water,
acetic acid in a range between 0 mass % and 50 mass %, and fat and oil; and
maintaining a temperature of the mixture during the high-pressure homogenization processing or ultrasonic homogenization processing at 40° C. or lower,
wherein:
the high-pressure homogenization processing is conducted at a pressure of 1 MPa or higher,
the dicotyledonous plant seeds comprise one or more seeds selected from the group consisting of almonds, cashew nuts, peanuts, red beans, kidney beans, mung beans, and soybeans, and
with respect to a total amount of the mixture, a blending amount of the dry powder of the dicotyledonous plant seeds is in a range of 1 mass % or more and 20 mass % or less, a blending amount of the water is in a range of 20 mass % or more and 69 mass % or less, and a blending amount of the fat and oil is in a range of 21 mass % or more and 70 mass % or less.

8. The method of claim 1, wherein the high-pressure homogenization processing is conducted at the pressure of 20 MPa or higher.

9. The method of claim 1, wherein the temperature of the mixture is maintained in a range of 10° C. or higher and 35° C. or lower during the high-pressure homogenization processing or ultrasonic homogenization processing.

10. The method of claim 1, wherein the dicotyledonous plant seeds comprise one or more seeds selected from the group consisting of almonds, cashew nuts, peanuts, red beans, kidney beans, mung beans, and soybeans.

11. The method of claim 10, wherein the dicotyledonous plant seeds consist of soybean seeds.

12. The method of claim 10, wherein the dicotyledonous plant seeds comprise one or more seeds selected from the group consisting of almonds, cashew nuts, and peanuts.

13. The method of claim 12, wherein the dry powder comprising the dicotyledonous plant seeds comprise 11S protein.

14. The method of claim 7, wherein the high-pressure homogenization processing is conducted at the pressure of 20 MPa or higher.

15. The method of claim 7, wherein the dicotyledonous plant seeds consist of soybean seeds.

16. The method of claim 7, wherein the dicotyledonous plant seeds comprise one or more seeds selected from the group consisting of almonds, cashew nuts, and peanuts.

17. The method according to claim 7, wherein the high-pressure homogenization processing or ultrasonic homogenization processing is performed until storage elasticity at an angular frequency of 10 rad/s becomes 10 Pa or more.

18. The method according to claim 17, wherein the high-pressure homogenization processing or ultrasonic homogenization processing is performed until loss tangent at the angular frequency of 10 rad/s becomes 3.5 or less.

19. A method for producing an emulsion composition, comprising:

high-pressure homogenization processing or ultrasonic homogenization processing of a mixture comprising:

dry powder of dicotyledonous plant seeds comprising 11S protein, the dry powder having an average particle size in a range of 5 μm or larger and 90 μm or smaller, water, acetic acid, and fat and oil; and maintaining a temperature of the mixture during the high-pressure homogenization processing or ultrasonic homogenization processing at 40° C. or lower to suppress thermal denaturation of the 11S protein, wherein:

the high-pressure homogenization processing is conducted at a pressure of 20 MPa or higher, the dicotyledonous plant seeds comprise one or more seeds selected from the group consisting of almonds, cashew nuts, and peanuts, and with respect to a total amount of the mixture, a blending amount of the dry powder of the dicotyledonous plant seeds is in a range of 1 mass % or more and 20 mass % or less, a blending amount of the water is in a range of 20 mass % or more and 69 mass % or less, a blending amount of the fat and oil is in a range of 21 mass % or more and 70 mass % or less, and a blending amount of the acetic acid in a range of more than 0 mass % and less than 50 mass %.

20. The method according to claim 19, wherein the 11S protein does not comprise denatured 11S protein after the maintaining.

* * * * *